US012594568B2

(12) United States Patent
Ito

(10) Patent No.: US 12,594,568 B2
(45) Date of Patent: Apr. 7, 2026

(54) LIQUID DISCHARGE APPARATUS, LIQUID DISCHARGE METHOD, AND STORAGE MEDIUM

(71) Applicant: Takayuki Ito, Kanagawa (JP)

(72) Inventor: Takayuki Ito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 579 days.

(21) Appl. No.: 18/067,251

(22) Filed: Dec. 16, 2022

(65) Prior Publication Data

US 2023/0202177 A1 Jun. 29, 2023

(30) Foreign Application Priority Data

Dec. 27, 2021 (JP) ................................ 2021-213208
Oct. 31, 2022 (JP) ................................ 2022-174970

(51) Int. Cl.

*B05B 12/04* (2006.01)
*B05B 1/14* (2006.01)
*B05B 12/12* (2006.01)
*B05B 12/14* (2006.01)
*B05B 13/04* (2006.01)
(Continued)

(52) U.S. Cl.

CPC .............. *B05B 12/122* (2013.01); *B05B 1/14* (2013.01); *B05B 12/04* (2013.01); *B05B 12/1472* (2013.01); *B05B 13/0431* (2013.01); *B41J 3/4073* (2013.01); *B41J 25/003* (2013.01); *B41J 25/308* (2013.01); *B41J 25/001* (2013.01)

(58) Field of Classification Search

None
See application file for complete search history.

(56) References Cited

U.S. PATENT DOCUMENTS

2001/0017085 A1* 8/2001 Kubo .................... B41J 3/4073
101/35
2004/0250760 A1 12/2004 Goto
(Continued)

FOREIGN PATENT DOCUMENTS

JP 11-157074 6/1999
JP 2002-113849 4/2002
(Continued)

OTHER PUBLICATIONS

Extended European Search Report for 22214215.0 mailed on May 4, 2023.

*Primary Examiner* — Binu Thomas
(74) *Attorney, Agent, or Firm* — IPUSA, PLLC

(57) ABSTRACT

A liquid discharge apparatus to discharge liquid to apply the liquid to an object includes a head, a mover, a rotator, and processing circuitry. The head has a nozzle surface in which a plurality of nozzle rows each including a plurality of nozzles to discharge the liquid are arranged. The mover relatively moves the head and the object in each of a first direction and a second direction orthogonal to each other along the nozzle surface. The rotator rotates the head along the nozzle surface. The processing circuitry controls the relative movement to correct unevenness of a nozzle interval between the plurality of nozzles along the second direction caused by an inclination between the first direction and a third direction when the head is rotated. The third direction is a direction in which the plurality of nozzles are arranged in each of the plurality of nozzle rows.

11 Claims, 36 Drawing Sheets

(51) Int. Cl.

| | |
|---|---|
| ***B41J 3/407*** | (2006.01) |
| ***B41J 25/00*** | (2006.01) |
| ***B41J 25/308*** | (2006.01) |

(56) References Cited

U.S. PATENT DOCUMENTS

| | | | | |
|---|---|---|---|---|
| 2009/0073200 | A1* | 3/2009 | Tezuka | B41J 3/4073 347/9 |
| 2011/0102489 | A1 | 5/2011 | Sakakibara et al. | |
| 2012/0236054 | A1 | 9/2012 | Ito et al. | |
| 2013/0194333 | A1 | 8/2013 | Ito et al. | |
| 2013/0257984 | A1* | 10/2013 | Beier | B41J 3/4073 347/19 |
| 2014/0347415 | A1 | 11/2014 | Ito et al. | |
| 2017/0157921 | A1 | 6/2017 | Tashiro et al. | |
| 2019/0061339 | A1 | 2/2019 | Tashiro et al. | |
| 2019/0337311 | A1* | 11/2019 | Fritz | B41J 3/4073 |
| 2020/0171817 | A1 | 6/2020 | Hada | |
| 2020/0207130 | A1* | 7/2020 | Matsuura | B41J 3/4073 |
| 2020/0303440 | A1 | 9/2020 | Hiraga | |
| 2022/0032651 | A1* | 2/2022 | Hasegawa | B41J 3/4073 |
| 2022/0111659 | A1 | 4/2022 | Abe et al. | |
| 2022/0184967 | A1 | 6/2022 | Hiraga | |

FOREIGN PATENT DOCUMENTS

| | | |
|---|---|---|
| JP | 2003-231247 | 8/2003 |
| JP | 4221921 | 2/2009 |
| JP | 2017-018884 | 1/2017 |
| JP | 2017-105193 | 6/2017 |
| JP | 2020-82709 | 6/2020 |
| WO | WO 2013/024551 A1 | 2/2013 |
| WO | 2013/129679 | 9/2013 |
| WO | 2020/204101 | 10/2020 |

* cited by examiner

LIQUID DISCHARGE APPARATUS, LIQUID DISCHARGE METHOD, AND STORAGE MEDIUM

CROSS-REFERENCE TO RELATED APPLICATIONS

This patent application is based on and claims priority pursuant to 35 U.S.C. § 119 (a) to Japanese Patent Application No. 2021-213208, filed on Dec. 27, 2021, and 2022-174970, filed on Oct. 31, 2022, in the Japan Patent Office, the entire disclosure of which is hereby incorporated by reference herein.

BACKGROUND

Technical Field

Embodiments of the present disclosure relate to a liquid discharge apparatus, a liquid discharge method, and a storage medium storing program code.

Related Art

In the related art, a liquid discharge apparatus is known to discharge liquid from a head including a nozzle surface in which nozzles are formed, to apply the liquid to an object.

In order to apply liquid to an object with high density, for example, a liquid discharge apparatus has a configuration in which a plurality of nozzles is arranged in a direction inclined with respect to a direction in which a head is moved.

SUMMARY

Embodiments of the present disclosure described herein provide a novel liquid discharge apparatus to discharge liquid to apply the liquid to an object. The liquid discharge apparatus includes a head, a mover, a rotator, and processing circuitry. The head has a nozzle surface in which a plurality of nozzle rows each including a plurality of nozzles to discharge the liquid are arranged. The mover relatively moves the head and the object in each of a first direction and a second direction orthogonal to each other along the nozzle surface. The rotator rotates the head along the nozzle surface. The processing circuitry controls the relative movement to correct unevenness of a nozzle interval between the plurality of nozzles along the second direction caused by an inclination between the first direction and a third direction when the head is rotated. The third direction is a direction in which the plurality of nozzles are arranged in each of the plurality of nozzle rows.

Embodiments of the present disclosure described herein provide a novel liquid discharge method to be executed by a liquid discharge apparatus that discharges liquid to apply the liquid to an object. The liquid discharge method includes discharging, moving, rotating, and controlling. The discharging discharges the liquid from a head having a nozzle surface in which a plurality of nozzle rows each including a plurality of nozzles to discharge the liquid are arranged. The relatively moving, by a mover, moves the head and the object in each of a first direction and a second direction orthogonal to each other along the nozzle surface. The rotating, by a rotator, rotates the head along the nozzle surface. The controlling controls relative movement by the mover to correct unevenness of a nozzle interval between the plurality of nozzles along the second direction caused by an inclination between the first direction and a third direction when the head is rotated by the rotator. The third direction is a direction in which the plurality of nozzles are arranged in each of the plurality of nozzle rows. Embodiments of the present disclosure described herein provide a novel non-transitory, computer-readable storage medium storing computer-readable program code that causes a liquid discharge apparatus that discharges liquid to apply the liquid to an object, to perform discharging, moving, rotating, and controlling. The discharging discharges the liquid from a head having a nozzle surface in which a plurality of nozzle rows each including a plurality of nozzles to discharge the liquid are arranged. The relatively moving, by a mover, moves the head and the object in each of a first direction and a second direction orthogonal to each other along the nozzle surface. The rotating, by a rotator, rotates the head along the nozzle surface. The controlling controls relative movement by the mover to correct unevenness of a nozzle interval between the plurality of nozzles along the second direction caused by an inclination between the first direction and a third direction when the head is rotated by the rotator. The third direction is a direction in which the plurality of nozzles are arranged in each of the plurality of nozzle rows.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
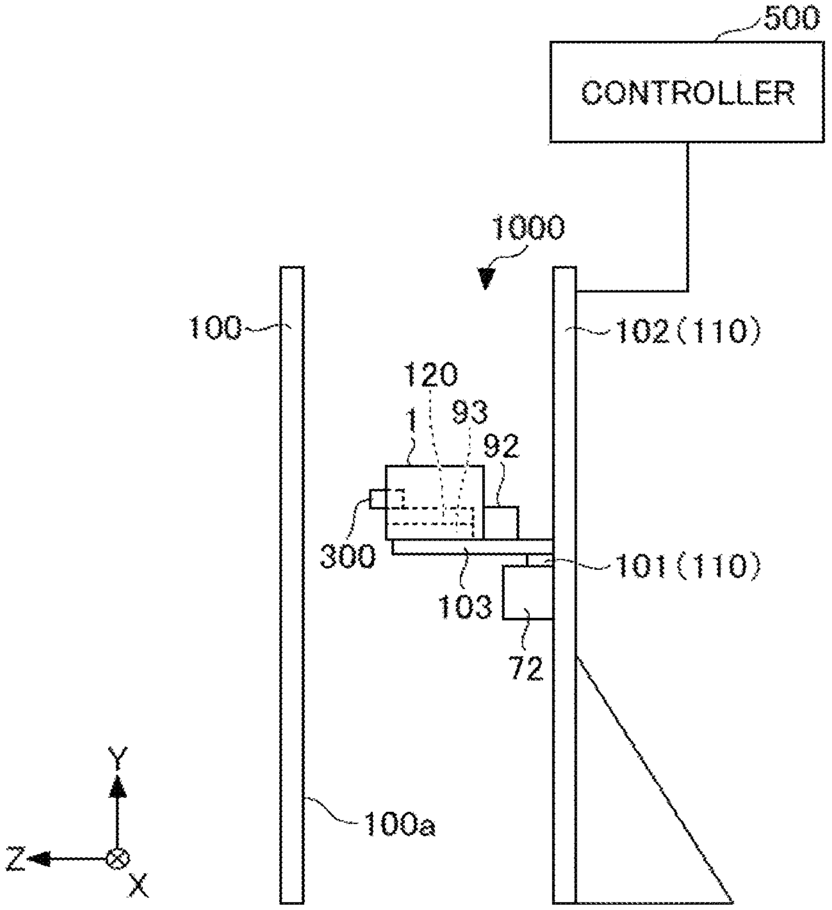
FIG. 1 is a side view illustrating an overall configuration of a liquid discharge apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a liquid discharge apparatus according to embodiments of the present disclosure are described in detail with reference to the drawings. However, the embodiments described below are some examples of the liquid discharge apparatus for embodying the technical idea of the present disclosure, and the embodiments of the present disclosure are not limited to the embodiments described below. Further, the size, material, and shape of components and the relative positions of the arranged components are given by way of example in the following description, and the scope of the present disclosure is not limited thereto unless particularly specified. Note that the size of these elements and the relative positions of these elements may be exaggerated for purposes of illustration in the drawings. In the description given below with reference to the drawings, like reference signs denote like elements, and overlapping description may be simplified or omitted as appropriate.

In the drawings illustrated below, directions may be indicated by X-axis, Y-axis, and Z-axis. An X-direction along the X-axis indicates a main-scanning direction which is a moving direction of a carriage provided for the liquid discharge apparatus according to embodiments of the present disclosure. A Y-direction along the Y-axis indicates a sub-scanning direction intersecting the main-scanning direction. A Z-direction along the Z-axis indicates a direction intersecting each of the X-direction and the Y-direction. Here, the X-direction is an example of a first direction, and the Y-direction is an example of a second direction.

A direction in which an arrow points in the X-direction is denoted as +X-direction, and a direction opposite to the +X-direction is denoted as −X-direction. A direction in which an arrow points in the Y-direction is denoted as +Y-direction, and a direction opposite to the +Y-direction is denoted as −Y-direction. A direction in which an arrow points in the Z-direction is referred to as a +Z-direction, and a direction opposite to the +Z-direction is denoted as a −Z-direction. In the embodiments of the present disclosure described below, the Y-direction is along the vertical direction, and the Z-direction is along the horizontal direction substantially orthogonal to the vertical direction as an example. However, the above-described directions do not limit the orientation of the liquid discharge apparatus in use, and the liquid discharge apparatus may be oriented in any direction.

Embodiments

Example of Overall Configuration of Liquid Discharge Apparatus 1000

Figure 2:
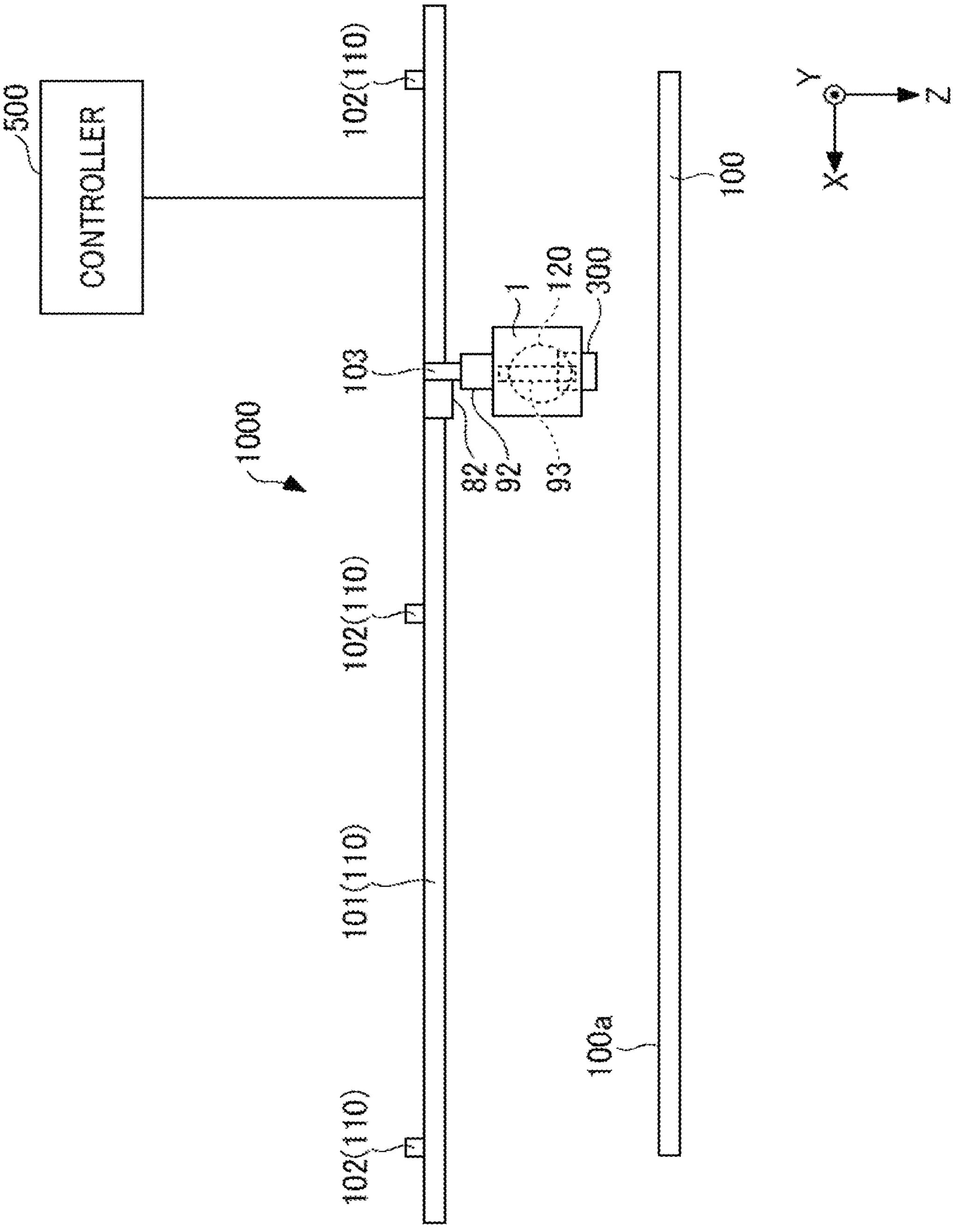
FIG. 2 is a front view illustrating the overall configuration of the liquid discharge apparatus according to embodiments of the present disclosure.

The configuration of a liquid discharge apparatus 1000 according to embodiments of the present disclosure is described with reference to FIGS. 1 and 2. FIGS. 1 and 2 are views illustrating an overall configuration of the liquid discharge apparatus 1000. FIG. 1 is a side view and FIG. 2 is a front view.

The liquid discharge apparatus 1000 applies ink, which is an example of liquid, to an object 100. The ink applied to the object 100 adheres to the object 100 after the ink dries.

A discharge method of the liquid discharge apparatus 1000 is, for example, a continuous discharge type. Examples of the continuous discharge type include a valve method in which discharge is controlled by controlling the operation of a valve body, and a continuous method in which particles of ink continuously discharged from a nozzle are charged, bent by a deflection electrode, and sprayed onto a printing surface.

Examples of an application surface 100*a*, which is a surface of the object 100, include non-permeable surfaces such as bodies of cars, trucks, and airplanes. The term "non-permeable" refers to a property that liquid applied to the application surface 100*a* of the object 100 does not permeate into the inside of the object 100. The liquid discharge apparatus 1000 can coat or paint a body of a car, a truck, or an aircraft by applying ink to the body. FIG. 1 illustrates an example of a flat object 100.

The application surface 100*a* is not limited to a surface having non-permeability and may be a surface having permeability. The application surface 100*a* is not limited to a flat surface and may be a surface having a curvature in the X-direction or the Y-direction. The use of the liquid discharge apparatus 1000 is not limited to coating or painting and may be a use in which an image is formed (or printed) with ink on a recording medium such as a sheet or a film.

As illustrated in FIGS. 1 and 2, the liquid discharge apparatus 1000 includes a head 300, a mover 110, a rotator 120, and a controller 500. In the liquid discharge apparatus 1000, the head 300 is disposed to face the application surface 100*a* of the object 100.

The head 300 includes a nozzle surface in which nozzles that discharge ink are formed. Each of the X-direction and the Y-direction is a direction along the nozzle surface. For example, the X-direction and the Y-direction are two directions that are substantially orthogonal to each other in a surface substantially parallel to the nozzle surface.

The head 300 applies the ink discharged from each of the plurality of nozzles to the object 100. The head 300 is disposed on a carriage 1.

The mover 110 is a mechanism that relatively moves the head 300 and the object 100 in each of the X-direction and the Y-direction along the nozzle surface. The mover 110 includes an X-axis rail 101 and a Y-axis rail 102.

A Z-axis rail 103 holds the carriage 1 so that the carriage 1 can move in the Z-direction. The X-axis rail 101 holds the Z-axis rail 103 such that the Z-axis rail 103 holding the carriage 1 is movable in the X-direction. The Y-axis rail 102 holds the X-axis rail 101 such that the X-axis rail 101 is movable in the Y-direction.

A Z-direction driver 92 moves the carriage 1 in the Z-direction along the Z-axis rail 103. A X-direction driver 72 moves the Z-axis rail 103 in the X-direction along the X-axis rail 101. A Y-direction driver 82 moves the X-axis rail 101 in the Y-direction along the Y-axis rail 102. Note that the movement of the carriage 1 and the head 300 in the Z-direction may not be parallel to the Z-direction and may be an oblique movement as long as the movement includes at least a component in the Z direction.

The rotator 120 is a mechanism that rotates the head 300 along the nozzle surface included in the head 300. For example, the rotator 120 is a turntable, and rotates a table on which the head 300 is disposed to rotate the head 300 in a surface substantially parallel to the nozzle surface.

The controller 500 controls the relative movement by the mover 110 and the rotation by the rotator 120 to control the application operation to the object 100 by the liquid discharge apparatus 1000. In particular, in the present embodiment, the controller 500 controls the relative movement by the mover 110 so that unevenness of the nozzle interval between the nozzles along the Y-direction is corrected. The unevenness of the nozzle interval is caused by the inclination between the X-direction and a direction of a nozzle row when the head 300 is rotated by the rotator 120.

The controller 500 is configured by a processor or an electric circuit mounted on an electric board. The controller 500 is electrically connected to at least drivers that drive the mover 110 and the rotator 120, and the head 300 in a wired or wireless manner. However, the electric board on which the controller 500 is mounted is arranged in any position, and the electric board may be arranged remotely with respect to the head 300.

The liquid discharge apparatus 1000 discharges ink from the head 300 toward the application surface 100*a* while moving the carriage 1 in each of the X-direction, the Y-direction, and the Z-direction to apply the ink to the application surface 100*a*.

More specifically, the liquid discharge apparatus 1000 discharges the ink from the head 300 and applies the ink to the object 100 while relatively moving the head 300 and the object 100 in the X-direction which is the main-scanning direction.

After one relative movement in the X-direction is completed, the liquid discharge apparatus 1000 relatively moves the head 300 and the object 100 in the Y-direction which is the sub-scanning direction. After one relative movement in the Y-direction is ended, the liquid discharge apparatus 1000 discharges ink from the head 300 while relatively moving the head 300 and the object 100 in the X-direction again, to apply the ink to the object 100. The liquid discharge apparatus 1000 repeats such relative movement in the X-direction and the Y-direction to apply ink to the object 100.

In a case where the object 100 is a flat object along the X-direction and the Y-direction, the liquid discharge apparatus 1000 does not perform relative movement between the head 300 and the object 100 in the Z-direction during an ink application operation. In a case where the object 100 has a shape in which the height differs in the Z-direction, the liquid discharge apparatus 1000 performs relative movement between the head 300 and the object 100 in the Z-direction according to the shape of the object 100 during the ink application operation.

Example of Hardware Configuration of Controller 500

Figure 3:
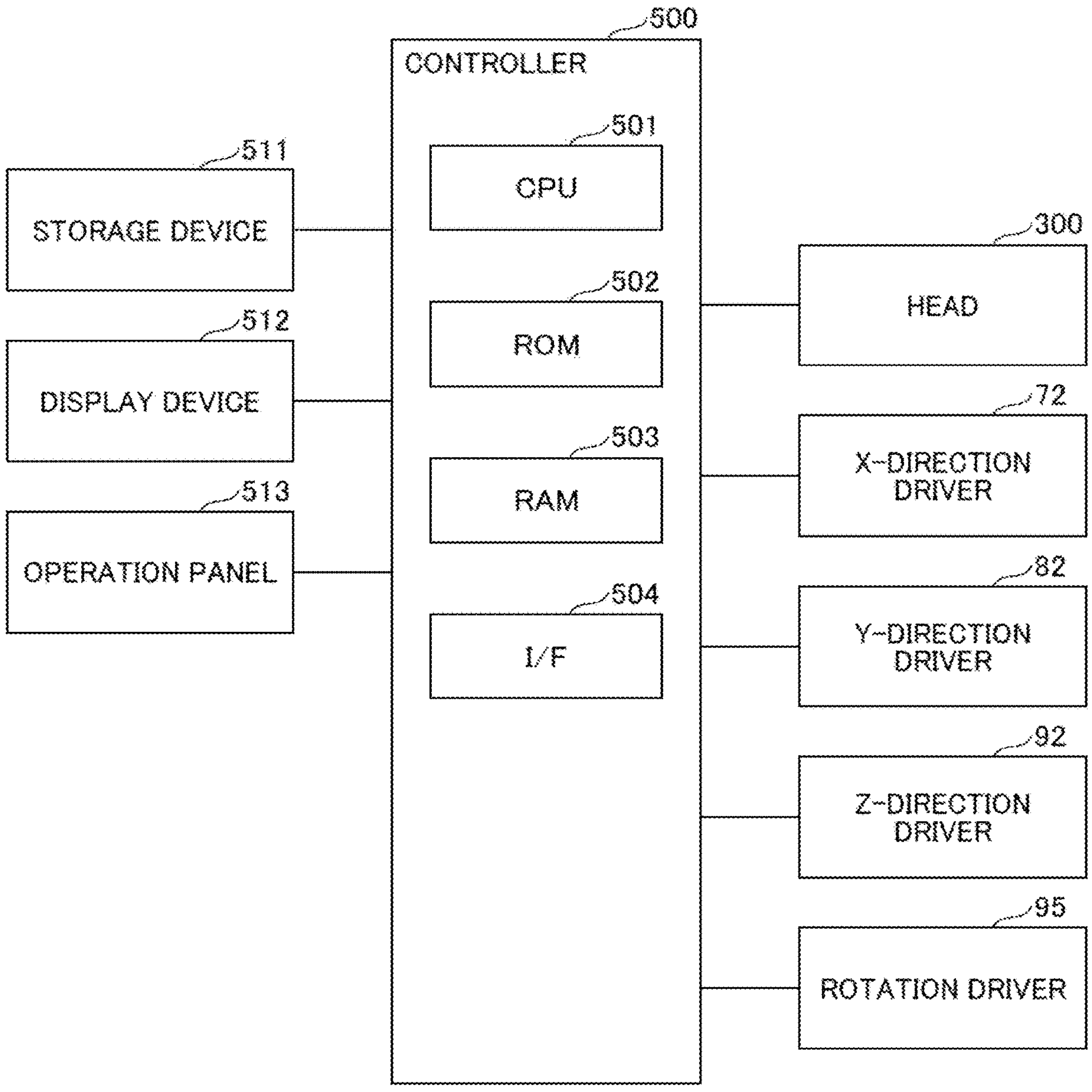
FIG. 3 is a diagram illustrating a hardware configuration of a controller according to embodiments of the present disclosure.

FIG. 3 is a block diagram illustrating an example of the hardware configuration of the controller 500 included in the liquid discharge apparatus 1000. The controller 500 includes a central processing unit (CPU) 501, a read only memory (ROM) 502, a random-access memory (RAM) 503, and an interface (I/F) 504. These units and components are electrically connected to each other through a system bus. The controller 500 is configured by, for example, a computer.

In addition, the controller 500 is electrically connected to the head 300, the X-direction driver 72, the Y-direction driver 82, the Z-direction driver 92, a rotation driver 95, a storage device 511, a display device 512, and an operation panel 513.

The CPU 501 uses a RAM 503 as a work area and executes a program stored in the ROM 502 to control the overall operation of the controller 500.

The ROM 502 is a non-volatile memory that stores programs for executing control such as a recording operation to the CPU 501 and stores other fixed data.

The RAM 503 is a volatile memory that temporarily stores, for example, image data such as patterns and characters to be drawn on the object 100 and shape information of the body of the object 100.

The I/F 504 is an interface that enables communication between an external apparatus such as a host personal computer (PC) and the controller 500.

The storage device 511 is a storage device such as a hard disk drive (HDD) or a solid state drive (SSD) that stores setting values set in advance. The information stored in the storage device 511 may be read and used by the CPU 501 when the CPU 501 executes a program.

Under the control of the controller 500, the display device 512 displays, for example, a setting screen for ink application conditions by the liquid discharge apparatus 1000.

The operation panel 513 is an operation input device such as a touch screen, a keyboard, or a mouse that receives an operation of the liquid discharge apparatus 1000. The operation panel 513 is used to input values (coordinates) for identifying an area where ink is discharged onto the object 100, to input a movement speed of the carriage 1, to input values for identifying image information and three-dimensional coordinate information (body information) used for applying ink onto the object 100, and to input a distance between the head 300 and the object 100.

Note that the display device 512 and the operation panel 513 may be integrated into a single screen such as a touch screen.

The X-direction driver 72 drives the carriage 1 in the X-direction based on instructions from the controller 500. The Y-direction driver 82 drives the carriage 1 in the Y-direction based on instructions from the controller 500. The Z-direction driver 92 drives the carriage 1 in the Z-direction based on instructions from the controller 500. The rotation driver 95 drives the rotator 120 to rotate the head 300 based on instructions from the controller 500.

The controller 500 controls the operations of the X-direction driver 72 and the Y-direction driver 82 to control the movement of the carriage 1, in which the head 300 is included, in the X-direction and the Y-direction. The controller 500 controls the operation of the Z-direction driver 92 to control the movement of the head 300 in the Z-direction with respect to the carriage 1. The controller 500 further controls the operation of the rotator 120 to control the rotation of the head 300. Further, the controller 500 controls discharge of ink from the head 300.

Example of Configuration of Supply Unit 200

Figure 4:
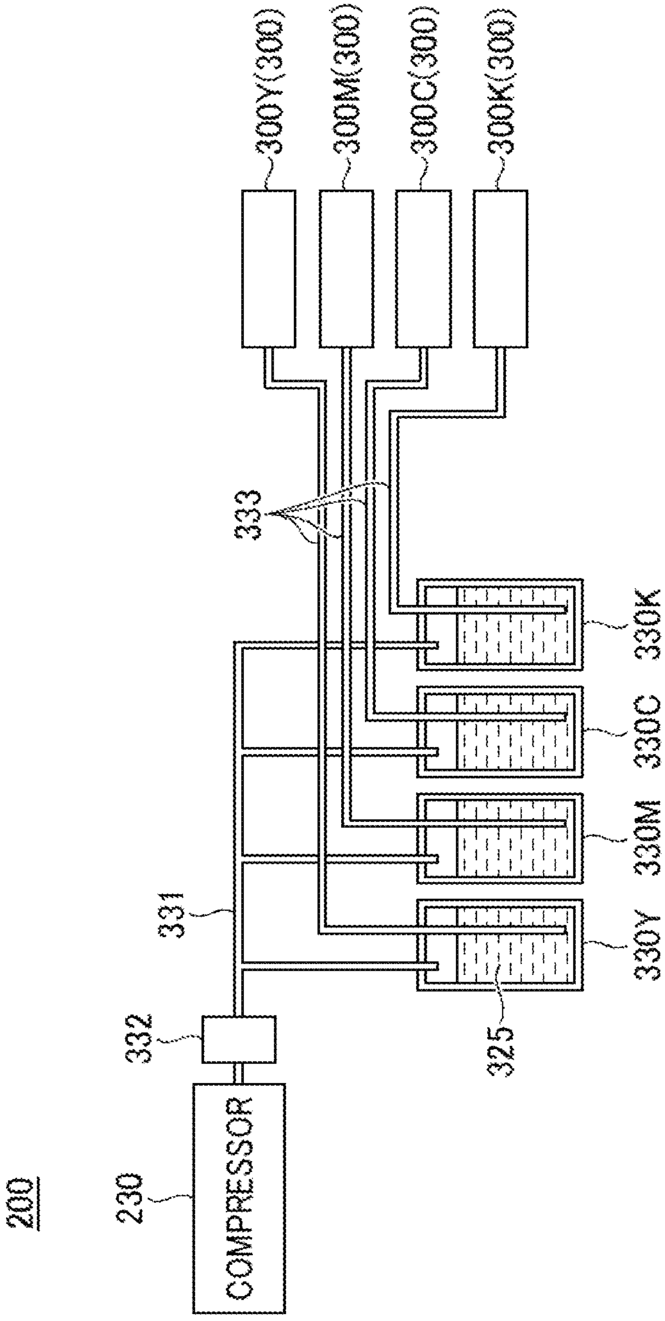
FIG. 4 is a diagram illustrating a configuration of a supply unit according to embodiments of the present disclosure.

FIG. 4 is a diagram illustrating an example of the configuration of a supply unit 200 of the liquid discharge apparatus 1000. The supply unit 200 supplies ink to the head 300.

The head 300 includes a head 300Y that discharges yellow (Y) ink, a head 300M that discharges magenta (M) ink, a head 300C that discharges (C) ink, and a head 300K that discharges black (K) ink. In a case where the heads 300Y, 300M, 300C, and 300K are not distinguished from each other, the heads 300Y, 300M, 300C, and 300K are collectively referred to as the heads 300 in the description below.

The heads 300 may further include another head, such as a head 300Q that discharges overcoating ink and a head 300P that discharges primer ink or white ink. The supply unit 200 supplies ink of each color to the head 300 of each color.

The supply unit 200 includes ink tanks 330Y, 330M, 330C, and 330K (hereinafter referred to as ink tanks 330 unless distinguished) as sealed containers that stores inks 325 of magenta, cyan, yellow, and black to be discharged from the heads 300M, 300C, 300Y, and 300K, respectively. The ink tank 330 and an ink inlet (supply port) of the head 300 are connected to each other through a tube 333 so that ink 325 flows.

On the other hand, the ink tank 330 is connected to a compressor 230 through a pipe 331 including an air regulator 332, and the compressor 230 supplies pressurized air. Accordingly, the pressurized ink 325 of each color is supplied to the ink inlet of each head 300, and the liquid discharge apparatus 1000 discharges the ink 325 from each nozzle of the head 300.

Example of Configuration of Head 300

Figure 5:
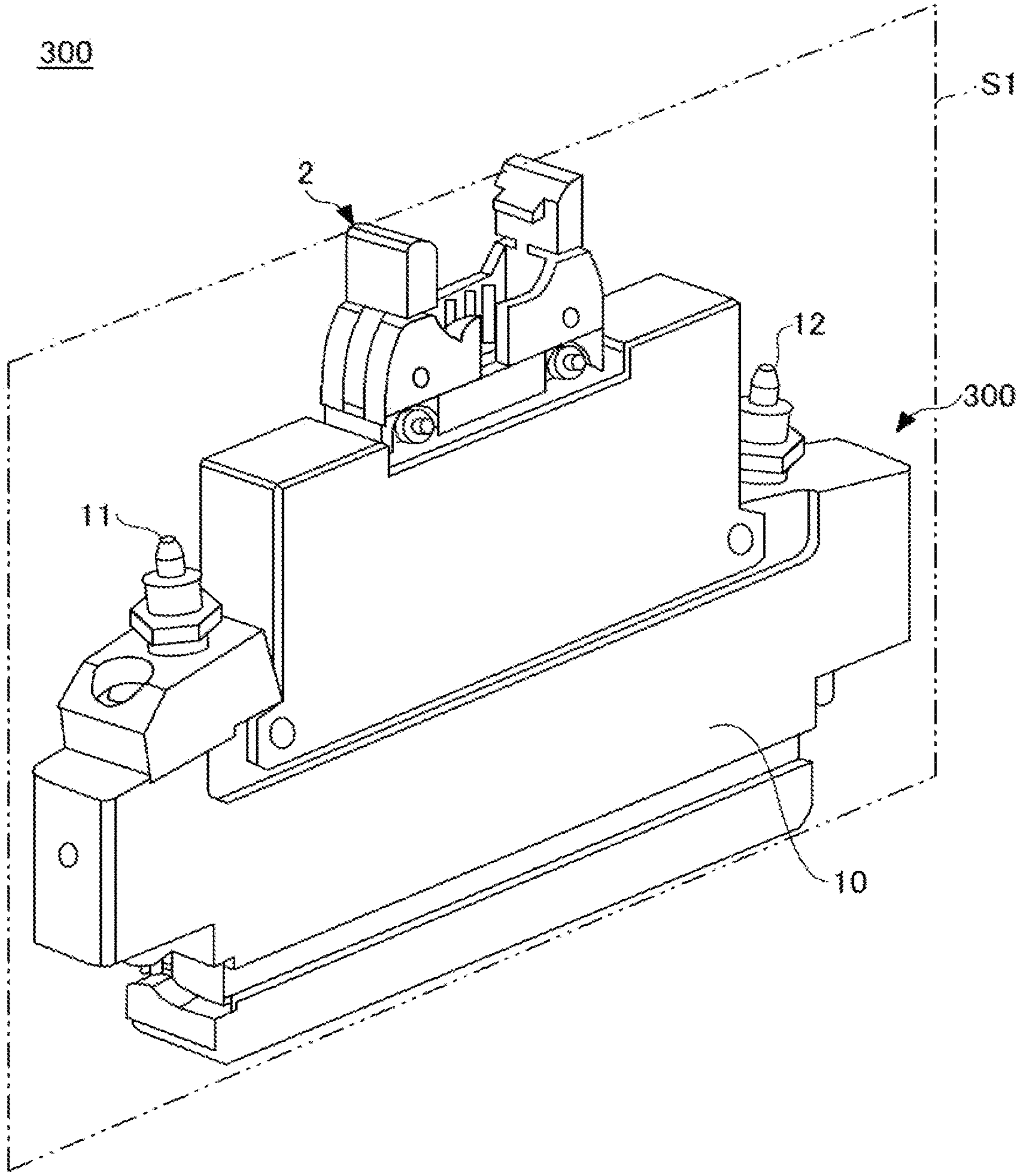
FIG. 5 is a perspective view illustrating a configuration of a head according to embodiments of the present disclosure.
Figure 6:
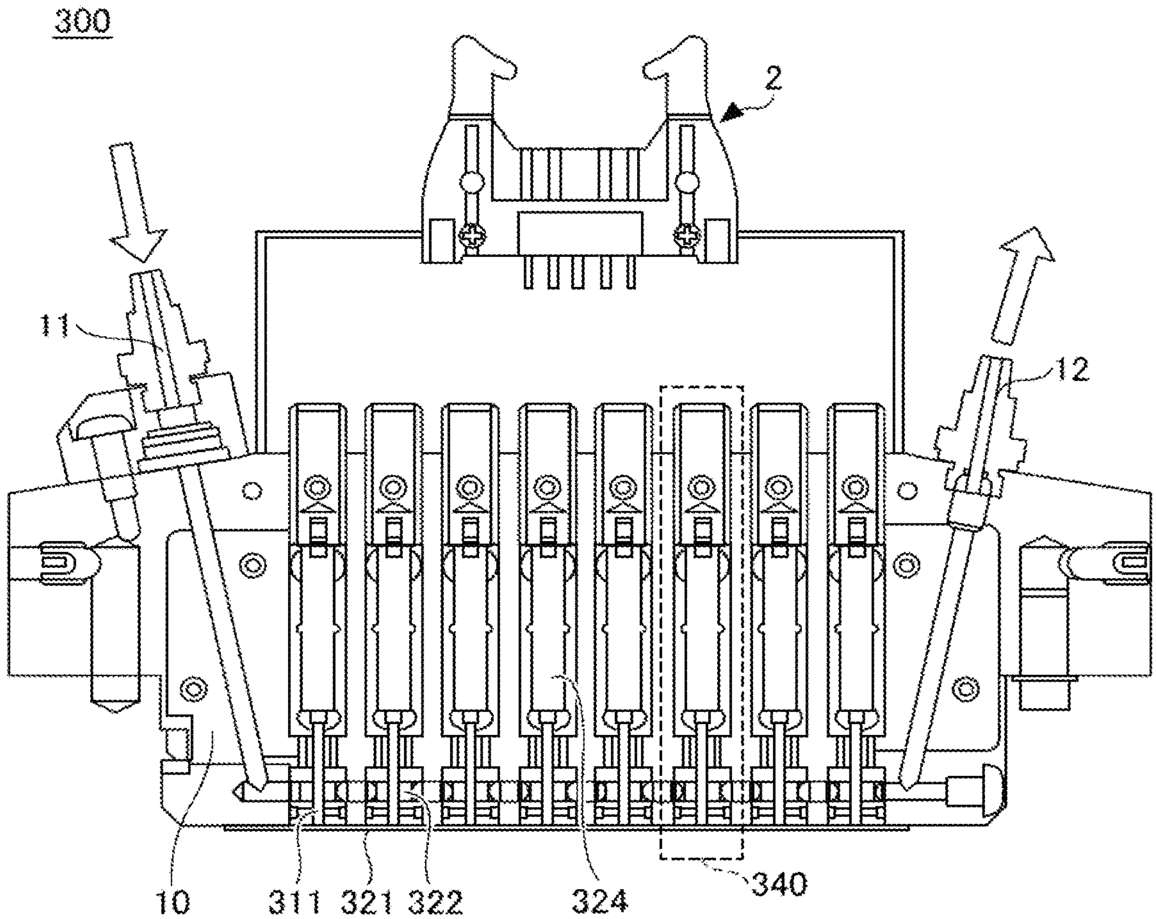
FIG. 6 is a cross-sectional view of the head cut by a plane S1 of FIG. 5.

FIGS. 5 and 6 are schematic views illustrating an example of the configuration of the head 300. FIG. 5 is a perspective view of the head 300, and FIG. 6 is a cross-sectional view of the head 300 cut by a plane S1 of FIG. 5.

The head 300 includes a plurality of discharge modules 340 arranged in one or a plurality of rows in a housing 10.

The head 300 includes a supply port 11 and a collection port 12. The supply port 11 supplies pressurized ink from the outside to each discharge module 340, and the collection port 12 sends out non-discharged ink to the outside. The housing 10 is provided with a connector 2.

The discharge module 340 includes a nozzle plate 321, a channel 322, and piezoelectric elements 324. Nozzles 311 that discharge liquid are formed in the nozzle plate 321. The channel 322 communicates with the nozzles 311 to supply pressurized liquid to the nozzles 311. Each piezoelectric element 324 drives a valve body having a needle shape to open and close the nozzle 311.

The nozzle plate 321 is joined to the housing 10. The channel 322 is a channel common to the plurality of discharge modules 340 formed in the housing 10. The pressurized ink is supplied from the supply port 11, and non-discharged ink is sends out from the collection port 12. Note that the send-out of ink from the collection port 12 may be temporarily stopped to prevent a decrease in the discharging rate of ink from the nozzles 311 during a period in which ink is discharged to the object 100.

Example of Functional Configuration of Controller 500

Figure 7:
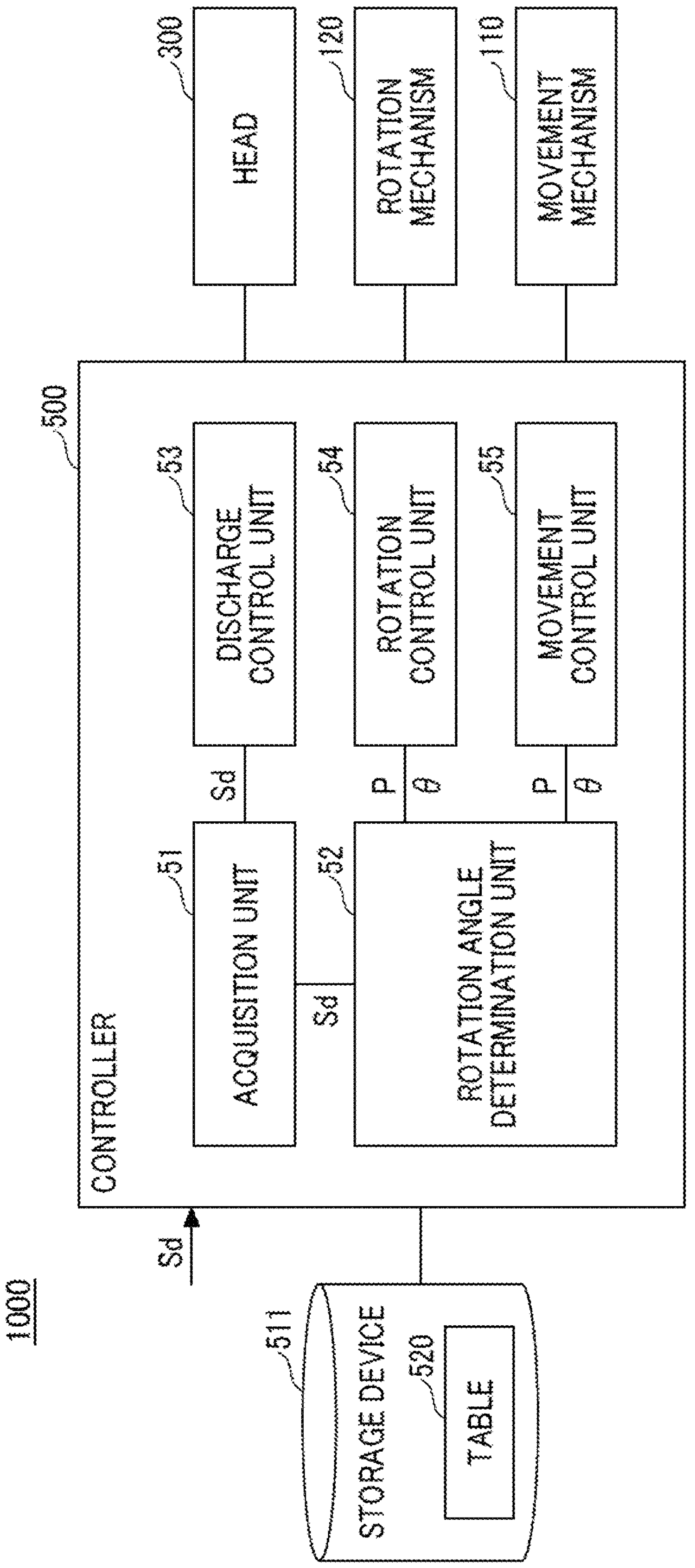
FIG. 7 is a diagram illustrating a functional configuration of the controller according to embodiments of the present disclosure.

FIG. 7 is a diagram illustrating an example of the functional configuration of the controller 500. The controller 500 includes an acquisition unit 51, a rotation angle determination unit 52, a discharge control unit 53, a rotation control unit 54, and a movement control unit 55.

The controller 500 controls the operation of the liquid discharge apparatus 1000 to apply ink to the object 100.

In the present embodiment, the rotation angle determination unit 52 of the controller 500 determines the rotation angle of the head 300 based on the shape information of the object 100 acquired from a host PC via the acquisition unit 51, and the rotation control unit 54 rotates the rotator 120 to rotate the head 300. In addition, when the controller 500 rotates the head 300 by a rotation angle θ determined by the rotation angle determination unit 52, the movement control unit 55 controls the relative movement by the mover 110 and the discharge control unit 53 controls the discharge of the ink 325 from the head 300 so that unevenness of the nozzle interval between adjacent ones of the nozzles in the head 300 along the Y-direction is corrected.

The controller 500 implements the respective functions of the acquisition unit 51, the rotation angle determination unit 52, the discharge control unit 53, the rotation control unit 54, and the movement control unit 55 by the CPU 501 deploying programs stored in the ROM 502 to the RAM 503 and executing the programs.

Note that at least some of the functions of the controller 500 may be implemented by any other element such as the head 300 than the controller 500. Alternatively, at least some of the functions of the controller 500 may be implemented by the controller 500 and any other element than the controller 500 in a distributed manner.

The acquisition unit 51 inputs shape information Sd of the object 100 from an external device such as a host PC and acquires the shape information Sd. The shape information Sd is three-dimensional information representing the shape of the object 100. The acquisition unit 51 may read the shape information Sd stored in advance in the storage device 511 to acquire the shape information Sd. Alternatively, the liquid discharge apparatus 1000 may include a detector to detect the shape of the object 100, and the acquisition unit 51 may receive, from the detection unit, the shape information Sd detected by the detection unit to acquire the shape information Sd. The acquisition unit 51 outputs the acquired shape information Sd to the rotation angle determination unit 52.

The rotation angle determination unit 52 determines the rotation angle θ of the head 300 by the rotator 120 based on the shape information Sd input from the acquisition unit 51. For example, the rotation angle determination unit 52 refers to the table 520 stored in the storage device 511 based on the shape information Sd and an application position P at which the ink 325 discharged from the head 300 is applied to the object 100, and determines the rotation angle θ. The table 520 is a table indicating a relation between the application position P and the rotation angle θ.

The dot interval along the Y-direction between adjacent dots of the ink 325 on the object 100 may be determined in advance, and the rotation angle determination unit 52 may determine the rotation angle θ so that the nozzle interval between adjacent ones of the nozzles along the Y-direction is substantially equal to the dot interval when the head 300 is rotated. In other words, the rotation angle determination unit 52 may not determine the rotation angle θ based on the shape information Sd.

The rotation angle determination unit 52 outputs information of the rotation angle θ determined for each application position P to the rotation control unit 54 and the movement control unit 55.

The discharge control unit 53 causes the head 300 to discharge the ink 325 based on the shape information Sd acquired by the acquisition unit 51. The discharge control unit 53 can control, for example, the ink amount of the ink 325 and the discharge timing.

The rotation control unit 54 causes the rotator 120 to control the rotation according to the rotation angle θ determined by the rotation angle determination unit 52 to rotate the head 300.

The movement control unit 55 controls the relative movement by the mover 110. In the present embodiment, the movement control unit 55 controls the X-direction driver 72, the Y-direction driver 82, and the Z-direction driver 92 to control the relative movement by the mover 110. In addition, in the present embodiment, the movement control unit 55 controls the relative movement by the mover 110 based on the rotation angle θ so that unevenness of the nozzle interval between adjacent ones of the nozzles in the head 300 along the Y-direction is corrected when the head 300 is rotated.

Operation Example of Liquid Discharge Apparatus 1000

Figure 8:
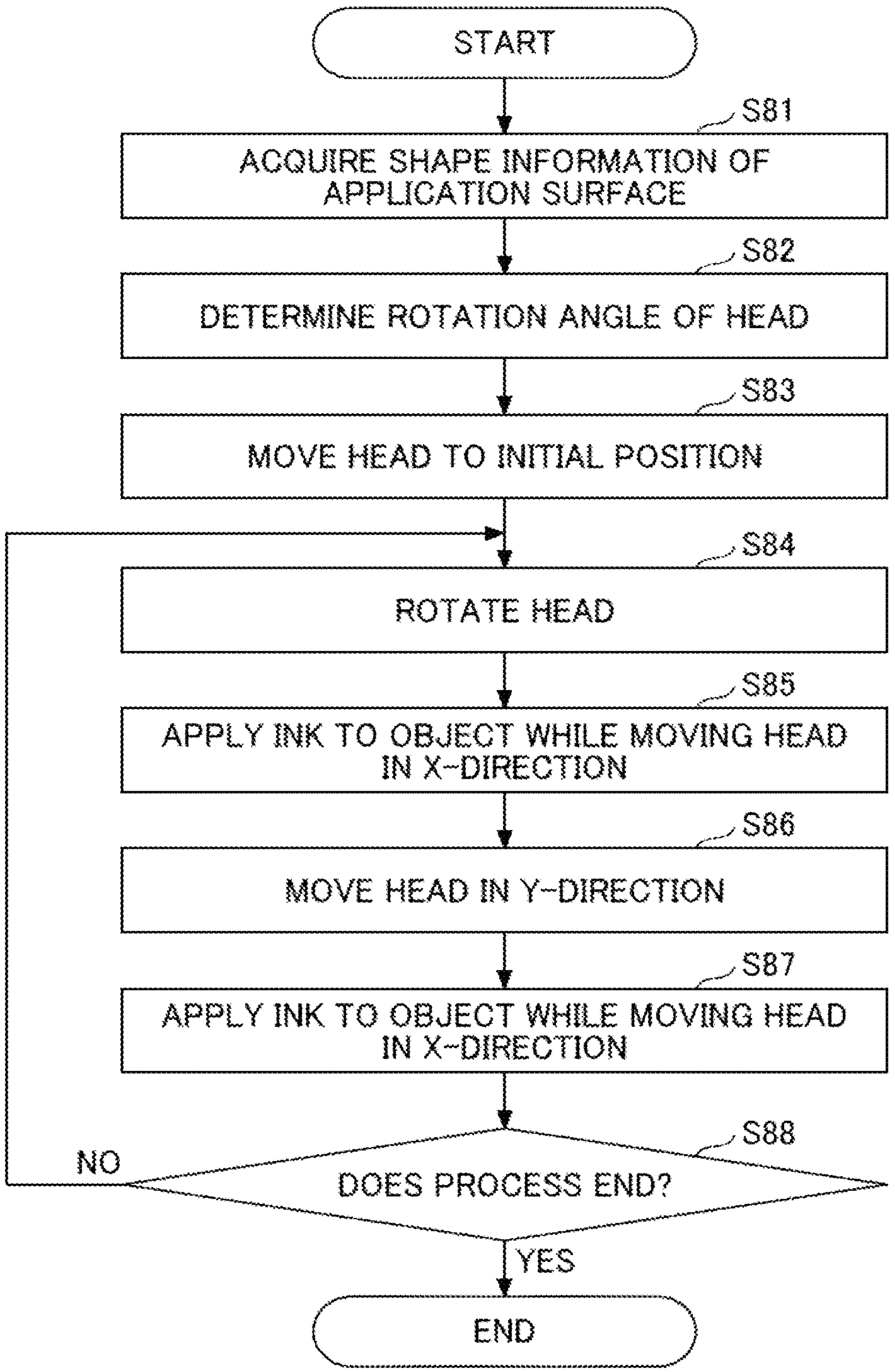
FIG. 8 is a flowchart of an operation of the liquid discharge apparatus according to embodiments of the present disclosure.

FIG. 8 is a flowchart of an operation of the liquid discharge apparatus 1000. FIG. 8 illustrates an operation of ink application to the object 100 by the liquid discharge apparatus 1000. The liquid discharge apparatus 1000 starts the operation illustrated in FIG. 8, for example, when the liquid discharge apparatus 1000 receives an instruction of ink application, input by a user through the operation panel 513.

First, in step S81, the acquisition unit 51 in the liquid discharge apparatus 1000 acquires the shape information Sd of the object 100 input from the external apparatus such as the host PC.

Subsequently, in step S82, the rotation angle determination unit 52 in the liquid discharge apparatus 1000 determines the rotation angle θ of the head 300 based on the shape information Sd input from the acquisition unit 51. The rotation angle determination unit 52 outputs information of the rotation angle θ determined for each application position P to the rotation control unit 54 and the movement control unit 55.

Subsequently, in step S83, the liquid discharge apparatus 1000 causes the movement control unit 55 to control the relative movement between the head 300 and the object 100 by the mover 110 to move the head 300 to an initial position and then stop the head 300.

Subsequently, in step S84, the liquid discharge apparatus 1000 rotates the head 300 by the rotation angle θ determined by the rotation angle determination unit 52 and then stops the head 300. Note that the operations in the steps S83 and S84 may be appropriately performed in any desired different order or may be performed in parallel.

Subsequently, in step S85, the discharge control unit 53 in the liquid discharge apparatus 1000 controls the discharge of the ink 325 from the head 300 to apply the ink 325 to the object 100 while the movement control unit 55 moves the head 300 in the X-direction (main-scanning direction). When the movement of the head 300 by one predetermined movement amount in the X-direction is ended, the movement control unit 55 stops the movement of the head 300, and the discharge control unit 53 stops the discharge of the ink 325 from the head 300.

Subsequently, in step S86, the controller 500 in the liquid discharge apparatus 1000 controls the relative movement by the mover 110 to move the head 300 in the Y-direction (sub-scanning direction) so that the movement control unit 55 corrects the unevenness of the nozzle interval between adjacent ones of the nozzles along the Y-direction caused by the inclination between the X-direction and the nozzle arrangement when the head 300 is rotated by the rotation angle θ.

Subsequently, in step S87, the discharge control unit 53 in the liquid discharge apparatus 1000 controls the discharge of the ink 325 from the head 300 to apply the ink 325 to the object 100 while the movement control unit 55 moves the head 300 in the X-direction (main-scanning direction). When the movement of the head 300 by a predetermined movement amount of one movement in the X-direction is ended, the movement control unit 55 stops the movement of the head 300, and the discharge control unit 53 stops the discharge of the ink 325 from the head 300.

The movement direction of the head 300 in step S87 may be the same direction (for example, the +X-direction) as the movement direction in step S85 or may be the opposite direction (for example, the −X-direction). In other words, the liquid discharge apparatus 1000 may perform bidirectional application in which the application is performed in the reciprocating movement of the head 300 along the X-direction or may perform unidirectional application in which the application is performed in the movement of only the forward path.

Subsequently, in step S84, the controller 500 in the liquid discharge apparatus 1000 determines whether the operation of the ink application to the object 100 is to be ended. The controller 500 can determine whether the operation of the ink application to the object 100 is to be ended based on, for example, data input by a user using the operation panel 513 or image data.

In step S88, when the controller 500 determines that the operation of the ink application to the object 100 is to be ended (YES in step S88), the liquid discharge apparatus 1000 ends the operation of the ink application. In step S88, when the controller 500 determines that the operation of the ink application to the object 100 is not to be ended (NO in step S88), the liquid discharge apparatus 1000 processes the operations of step S84 to step 88 again.

Due to the above-described processing, the liquid discharge apparatus 1000 can apply the ink 325 to the object 100. In the present embodiment, the operation in which the rotation angle determination unit 52 determines the rotation angle θ for each application position P in the overall object 100 in advance before the ink 325 is applied to the object 100 in step S82 has been described as an example. However, embodiments of the present disclosure are not limited to such a configuration. For example, in the liquid discharge apparatus 1000, the rotation angle determination unit 52 may determine the rotation angle θ and output the rotation angle θ to the rotation control unit 54 and the movement control unit 55 each time the application position P on the object 100 changes due to the relative movement of the head 300.

Example of Rotation of Head 300

Figure 9:
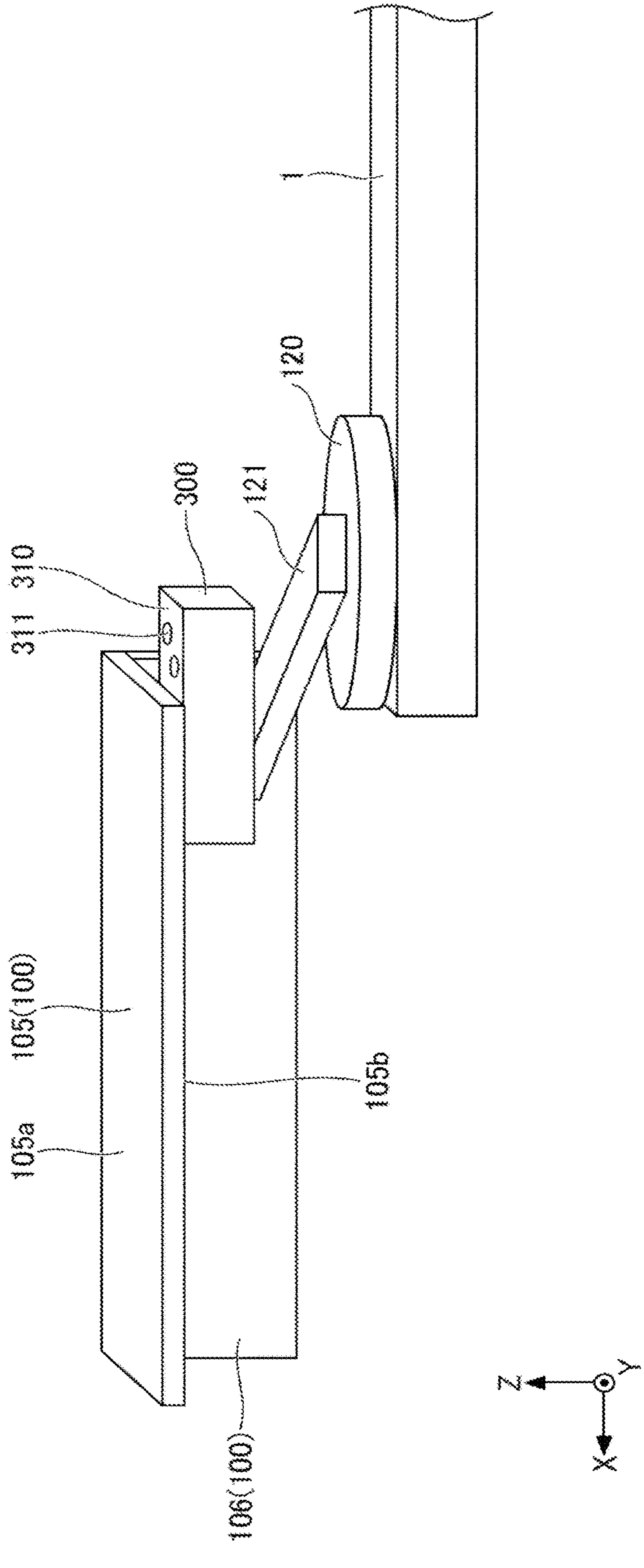
FIG. 9 is a first diagram illustrating an example of rotation of the head.
Figure 10:
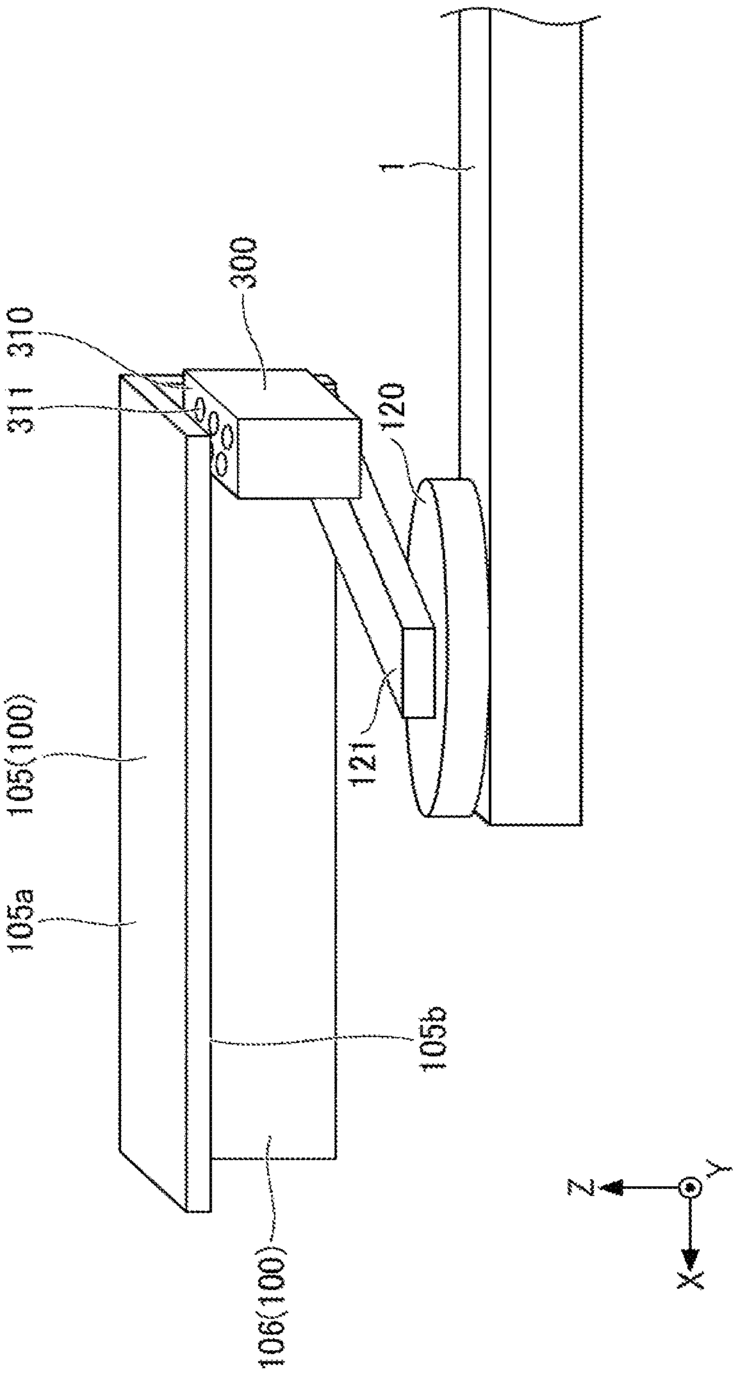
FIG. 10 is a second diagram illustrating the example of rotation of the head.
Figure 11:
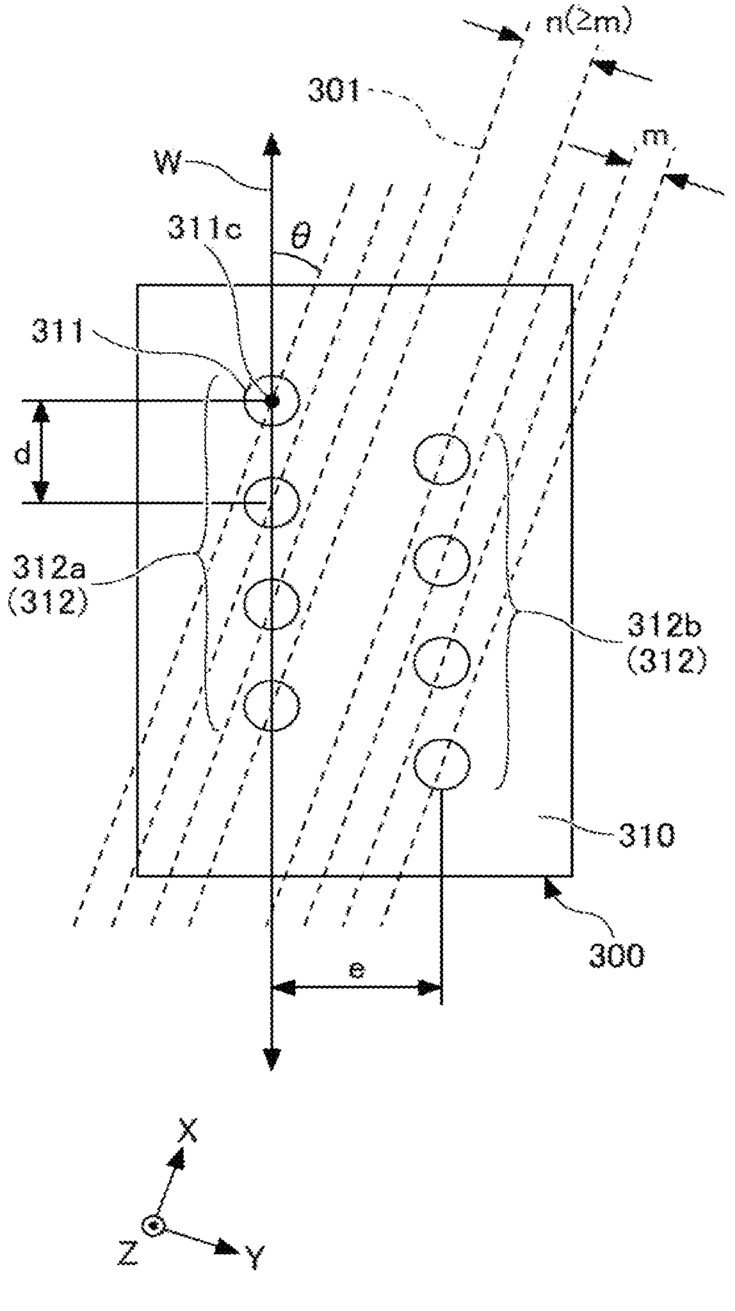
FIG. 11 is a first diagram illustrating an example of a relation between the rotation of the head and an interval of nozzle passing lines.
Figure 12:
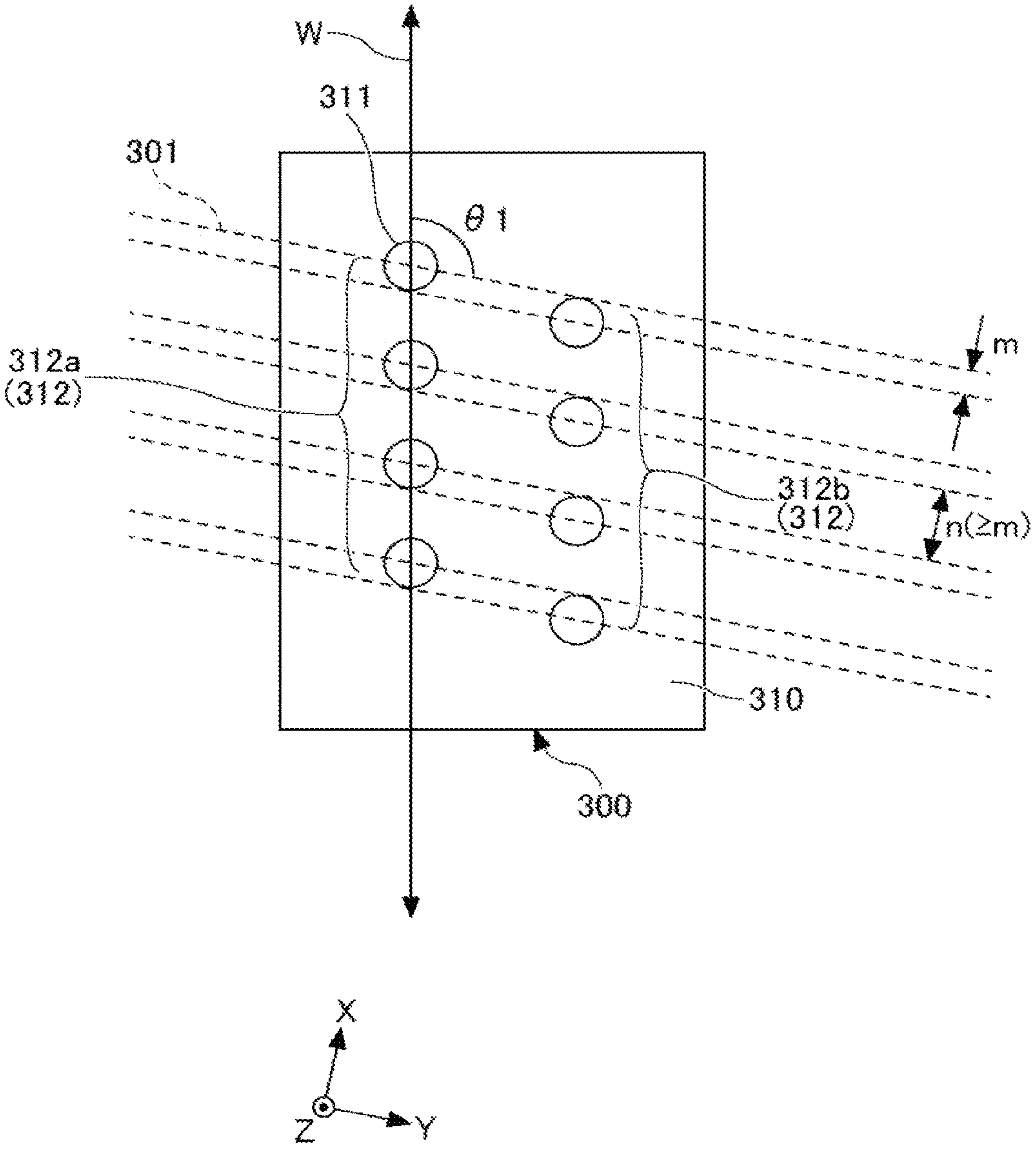
FIG. 12 is a second diagram illustrating an example of the relation between the rotation of the head and the interval of nozzle passing lines.

An example of rotation of the head 300 in the liquid discharge apparatus 1000 is described with reference to FIGS. 9 to 12. FIGS. 9 and 10 are diagrams illustrating an example of rotation of the head 300. FIG. 9 is a first diagram and FIG. 10 is a second diagram of the example of rotation of the head. FIGS. 11 and 12 are diagrams illustrating an example of a relation between the rotation of the head 300 and an interval of nozzle passing line 301. FIG. 11 is a first diagram and FIG. 12 is a second diagram of the example of the relation.

As illustrated in FIGS. 9 and 10, as an example, the liquid discharge apparatus 1000 applies the ink 325 discharged from the head 300 to a top board 105 in the object 100 including the top board 105 and a side plate 106.

The top board 105 includes a front surface **105*a* which is a surface on the +Z-direction side and a back surface 105*b* which is a surface on the −Z-direction side. The liquid discharge apparatus 1000 applies the ink 325 to the back surface 105*b***.

In the liquid discharge apparatus 1000, the head 300 is supported by the rotator 120 of the carriage 1 via the support member 121. The head 300 includes a nozzle surface 310 and a plurality of nozzles 311 formed on the nozzle surface 310. The liquid discharge apparatus 1000 supports the head 300 so that the nozzle surface 310 faces the back surface **105*b* of the top board 105**.

The liquid discharge apparatus 1000 can rotate the rotator 120 to rotate the head 300 at any rotation angle θ in a plane substantially parallel to the nozzle surface 310.

When the liquid discharge apparatus 1000 performs an application operation of the ink 325, the liquid discharge apparatus 1000 first determines the rotation angle θ of the head 300 that is advantageous for a go-around operation of applying the ink 325 to the back surface **105*b* of the top board 105 based on the shape information Sd of the object 100. FIGS. 9 and 10 illustrate different states of the rotation angle θ of the head 300. Note that the rotation angle θ is illustrated in FIG. 11 described next. The liquid discharge apparatus 1000 can rotate the head 300 to the state illustrated in, for example, FIG. 9 or 10**.

FIG. 11 is a diagram illustrating the nozzle surface 310 viewed from the +Z-direction side. The head 300 includes a plurality of nozzle rows 312 in each of which a plurality of nozzles 311 are arranged along a nozzle row direction W as an example of a third direction.

In the example illustrated in FIG. 11, the nozzle row 312 includes two nozzle rows 312, which are a first nozzle row **312*a* and a second nozzle row 312*b*. In a case where the first nozzle row 312*a* and the second nozzle row 312*b* are not distinguished from each other, the first nozzle row 312*a* and the second nozzle row 312*b* are collectively referred to as the nozzle rows 312** in the description below.

The first nozzle row **312*a* and the second nozzle row 312*b* are arranged side by side at a row interval e along a direction substantially orthogonal to the nozzle row direction W. The number of nozzles 311 included in one nozzle row 312 is four. The four nozzles 311** included in one nozzle row are arranged at a nozzle interval d along the nozzle row direction W.

The nozzle row direction W is a direction along the nozzle surface 310 included in the head 300 and is, for example, any direction in a plane substantially parallel to the nozzle surface 310. The nozzle row direction W is determined by the rotation angle θ of the head 300. As illustrated in FIG. 11, in the present embodiment, the angle formed by the X-direction which is the main-scanning direction and the nozzle row direction W is equal to the rotation angle θ. Note that the nozzle row direction W may intersect each of the X-direction and the Y-direction or may be a direction substantially parallel to any one of the X-direction and the Y-direction.

In the present embodiment, the first nozzle row **312*a* and the second nozzle row 312*b* are formed to be shifted from each other along the nozzle row direction W by approximately half of the nozzle interval d of the nozzles 311. As a result, the nozzles 311** are arranged in a staggered arrangement.

In the head 300, the number of nozzle rows 312, the number of nozzles 311 included in the head 300, and the number of nozzles 311 included in one nozzle row 312 are not limited to any particular numbers, and the nozzle rows 312 and the nozzles 311 illustrated in FIG. 11 are one example. The arrangement of the nozzles 311 is not also limited to the staggered arrangement.

The nozzle passing line 301 is a line passing through the nozzle center 311*c* of each of the plurality of nozzles 311 included in the head 300 along the X-direction. In the example illustrated in FIG. 11, since the head 300 includes a total of eight nozzles 311, a total of eight nozzle passing lines 301 are illustrated.

In the present embodiment, the intervals between the nozzle passing lines 301 adjacent to each other along the Y-direction, which is the sub-scanning direction, among the eight nozzle passing lines 301 include a first interval m and a second interval n.

When the head 300 is rotated by a rotation angle θ by the rotator 120, the interval between the adjacent nozzles 311 along the Y-direction is a value of d multiplied by sin 0. The first interval m is equal to the value of d multiplied by sin 0. Although the length of the second interval n varies depending on the row interval e or the nozzle arrangement such as a staggered arrangement, in the present embodiment, the row interval e or the nozzle arrangement is determined in advance so that the row interval e is equal to or greater than the length of the first interval m regardless of the rotation angle θ.

The first interval m and the second interval n change according to the rotation angle θ of the head 300. When the ink 325 discharged from each nozzle 311 is applied to the object 100 while the head 300 moves in the X-direction in a case where the first interval m and the second interval n are different from each other due to the rotation angle θ of the head 300, unevenness of application corresponding to the difference between the first interval m and the second interval n may occur.

In other words, the difference between the first interval m and the second interval n is unevenness of the nozzle interval between the nozzles 311 along the Y-direction. In the liquid discharge apparatus 1000 according to the present embodiment, the controller 500 controls the relative movement by the mover 110 to correct the unevenness of the nozzle interval between the nozzles 311 along the Y-direction caused by the inclination (rotation angle θ) between the X-direction and the nozzle row direction W when the head 300 is rotated by the rotator 120.

FIG. 12 illustrates a state in which the head 300 is rotated by 90 degrees from the state illustrated in FIG. 11 and the inclination between the X-direction and the nozzle row direction W is a rotation angle θ1. Compared with FIG. 11, FIG. 12 is different in only the rotation angle θ1, and the function and operation of each component in the liquid discharge apparatus 1000 are similar to, even if not the same as, those described with reference to FIG. 11.

First Embodiment

Example of Ink Application according to First Embodiment

Figure 13:
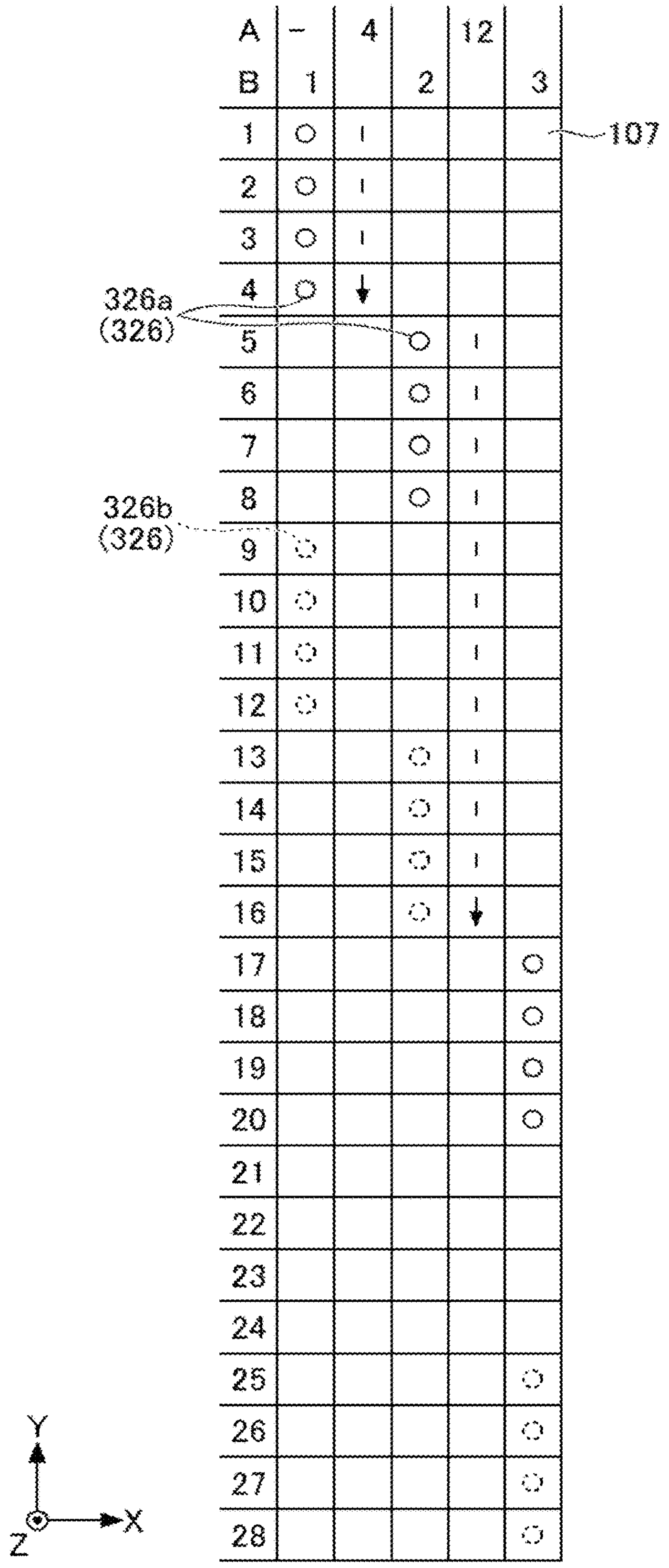
FIG. 13 is a diagram illustrating an example of ink application according to a first embodiment of the present disclosure.
Figure 14:
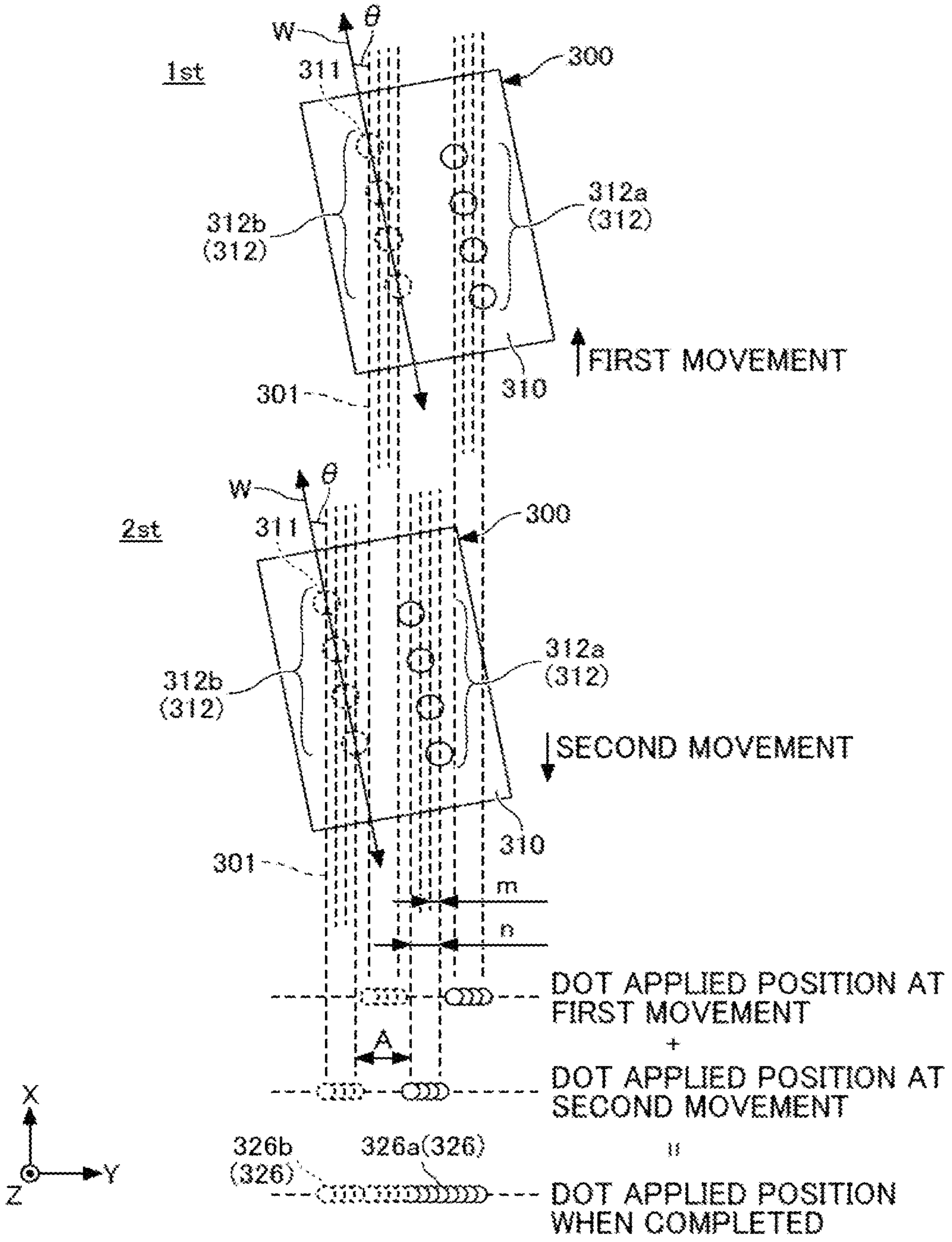
FIG. 14 is a diagram illustrating an example of a relation between rotation of the head and a dot interval according to the first embodiment of the present disclosure.

An example of ink application according to the first embodiment by the liquid discharge apparatus 1000 is described with reference to FIGS. 13 and 14. FIG. 13 is a diagram illustrating an example of the ink application. FIG. 14 is a diagram illustrating an example of the relation between the rotation of the head 300 and the dot interval.

The liquid discharge apparatus 1000 rotates the head 300 by the rotation angle θ and then moves the head 300 once along the X-direction to apply the ink 325 to the back surface 105*b* of the top board 105 so that adjacent dots of the ink 325 are applied as close to each other as possible on the back surface 105*b*.

FIG. 13 illustrates dots of the ink 325 applied to the object 100 when the liquid discharge apparatus 1000 performs intermittent movement by a predetermined movement amount in the Y-direction and movement three times in the X-direction by the mover 110.

Grids 107 aligned along the Y-direction indicate application positions along the Y-direction at which the ink 325 is applied to the object 100. The movement amount A indicates an amount of movement of the head 300 in the Y-direction by the mover 110 expressed in units of the number of grids which is the number of grids 107. The numbers 1 to 28 illustrated in FIG. 13 are numbers for distinguishing dots 326 applied along the Y-direction.

The length of the grid 107 along the Y-direction is a predetermined dot interval along the Y-direction between the inks 325 adjacent to each other on the object 100. For example, the rotation angle determination unit 52 determines the rotation angle θ so that the length of the grid 107 and the nozzle interval between the nozzles along the Y-direction when the head 300 is rotated, for example, the first interval m, are substantially the same.

The number of times of movement B indicates the number of times of movement of the head 300 in the X-direction along the X-direction.

A first dot 326*a* indicated by a solid line circle indicates a dot of the ink 325 applied to the object 100 by the ink 325 discharged from the first nozzle row 312*a*. A second dot 326*b* indicated by a broken line circle indicates a dot of the ink 325 applied to the object 100 by the ink 325 discharged from the second nozzle row 312*b*. Note that the first dot 326*a* and the second dot 326*b* are collectively referred to as the dot(s) 326 in the description below in a case where the first dot 326*a* and second dot 326*b* are not distinguished from each other. FIG. 14 illustrates a position relation between the head 300 and the dots 326 applied to the object 100 in the movement along each of the X-direction and the Y-direction. "1st" indicates the first movement of the head 300 in the X-direction, and "2nd" indicates the second movement of the head 300 in the X-direction. The dots 326 indicate dots of the ink 325 applied to the object 100 by the first and second movements of the head 300 along the X-direction.

In the example illustrated in FIGS. 13 and 14, the head 300 is rotated by a rotation angle θ by the rotator 120, and the nozzle row direction W and the X-direction are inclined by the rotation angle θ. In the example illustrated in FIGS. 13 and 14, the second interval n is four times the first interval m.

In the present embodiment, the controller 500 controls the mover 110 to perform one or more relative movements along the X-direction to apply the ink 325 to the area corresponding to the length of the first interval m in the object 100 and one relative movement along the X-direction to apply the ink 325 to the area corresponding to the length of the first interval m in the object 100. During the relative movement along the X-direction, the ink 325 is discharged from the head 300 and applied to the object 100.

The controller 500 controls the mover 110 to perform one or more relative movements along the X-direction to apply the ink 325 to an area of the object 100 corresponding to the length of the first interval m. After that, the controller 500 controls the mover 110 to perform one relative movement along the X-direction to apply the ink 325 to an area of the object 100 corresponding to the length of the second interval n. Then, the controller 500 controls the mover 110 to perform one or more relative movements along the X-direction to apply the ink 325 to an area of the object 100 corresponding to the length of the first interval m.

Specifically, in the example illustrated in FIGS. 13 and 14, the first interval m is the length of one dot 326, and the second interval n is the length of four dots 326. In other words, the controller 500 controls the rotator 120 to rotate the head 300 so that the second interval n be four times the first interval m, which is an integral multiple of the first interval m.

The controller 500 controls the mover 110 so that one relative movement along the X-direction is performed in order to apply four first dots 326*a* and four second dots 326*b* corresponding to the length of the first interval m in the object 100. Subsequently, the controller 500 controls the mover 110 so that one relative movement along the X-direction is performed in order to apply four first dots 326*a* corresponding to the length of the second interval n in the object 100. Then, the controller 500 controls the mover 110 so that one relative movement along the X-direction is performed in order to apply four first dots 326*a* and four second dots 326*b* corresponding to the length of the first interval m in the object 100.

As illustrated in FIGS. 13 and 14, in the first movement of the head 300 along the X-direction, the first dots 326*a* are applied to the areas of the dot numbers 1 to 4 with the ink 325 discharged from the first nozzle row 312*a*. In addition, the second dots 326*b* are applied to the areas of the dot numbers 9 to 12 with the ink 325 discharged from the second nozzle row 312*b*. Accordingly, the ink 325 is applied to an area corresponding to the length of the first interval m in the object 100.

Next, the controller 500 moves the head 300 in the Y-direction by four dots 326, and then performs second movement of the head 300 along the X-direction. In the second movement, the first dots 326*a* are applied to the areas of the dot numbers 5 to 8 with the ink 325 discharged from the first nozzle row 312*a*. In addition, the second dots 326*b* are applied to the areas of the dot numbers 13 to 16 with the ink 325 discharged from the second nozzle row 312*b*. Accordingly, the ink 325 is applied to the area corresponding to the length of the second interval n in the object 100.

As illustrated in FIG. 14, 16 dots 326 are applied at substantially equal intervals along the Y-direction by the two movements of the head 300 described above along the X-direction. In this manner, when the head 300 is rotated by the rotator 120, the liquid discharge apparatus 1000 can apply the ink 325 to the object 100 so that the unevenness of the nozzle interval between the nozzles 311 along the Y-direction caused by the inclination between the X-direction and the nozzle row direction W is corrected.

As described above, the liquid discharge apparatus 1000 according to the present embodiment discharges the ink 325 (liquid) and applies the ink 325 to the object 100.

The liquid discharge apparatus 1000 includes the head 300 including the nozzle surface 310 on which the nozzles 311 to discharge ink 325 are formed, the mover 110 to relatively move the head 300 and the object 100 in each of an X-direction and a Y-direction orthogonal to each other along the nozzle surface 310, the rotator 120 to rotate the head 300 along the nozzle surface 310, and the controller 500 to control the relative movement by the mover 110 and the rotation by the rotator 120.

The head 300 includes the first nozzle row 312*a* and the second nozzle row 312*b* (a plurality of nozzle rows) in which a plurality of nozzles 311 are arranged in a nozzle row direction W (a third direction). The controller 500 controls the relative movement by the mover 110 to correct the unevenness of the nozzle interval between the nozzles 311 along the Y-direction caused by the rotation angle θ which is the inclination between the X-direction and the nozzle row direction W when the head 300 is rotated by the rotator 120.

For example, the liquid discharge apparatus 1000 controls the mover 110 so that the ink 325 is applied in the subsequent relative movement of the head 300 along the X-direction to an area where the ink 325 is not applied on the object 100 since the nozzles 311 are not arranged due to the rotation of the head 400. Due to the above-described configuration, in the present embodiment, the liquid discharge apparatus 1000 can be provided that prevents uneven application of the ink 325 to the object 100 to uniformize the film thickness of the ink 325 and that is excellent in the application qualities of the ink 325 to the object 100.

In the present embodiment, the nozzle passing line 301 is a line passing through the nozzle center 311*c* of each of the plurality of nozzles 311 included in the head 300 along the X-direction. The intervals between the nozzle passing lines 301 adjacent to each other along the Y-direction among the plurality of nozzle passing lines 301 include the first interval m and the second interval n. The length of the second interval n is greater than or equal to the length of the first interval m. The controller 500 controls the mover 110 to perform one or more relative movements along the Y-direction to apply the ink 325 to an area of the object 100 corresponding to the length of the first interval m, and to perform one relative movement along the X-direction to apply the ink 325 to an area of the object 100 corresponding to the length of the second interval n.

For example, after the controller 500 controls the mover 110 to perform one or more relative movements along the X-direction to apply the ink 325 to an area of the object 100 corresponding to the length of the first interval m, the controller 500 causes the mover 110 to control one relative movement along the X-direction to apply the ink 325 to an area of the object 100 corresponding to the length of the second interval n. Subsequently, the controller 500 controls the mover 110 to perform one or more relative movements along the X-direction to apply the ink 325 to an area of the object 100 corresponding to the length of the first interval m. Accordingly, the liquid discharge apparatus 1000 can apply the ink 325 to an area where the ink 325 is not applied on the object 100 since the nozzles 311 are not arranged due to the rotation of the head 300, thus allowing the unevenness of the nozzle interval to be corrected.

In the present embodiment, the controller 500 controls the rotator 120 to rotate the head 300 based on the shape information Sd (shape) of the object 100. For example, the liquid discharge apparatus 1000 includes a detector to detect the shape of the object 100, and the controller 500 controls the rotator 120 to rotate the head 300 based on the shape information Sd detected by the detector. Alternatively, the controller 500 controls the rotator 120 to rotate the head 300 based on the shape information Sd read from the storage device 511 that stores the shape information Sd of the object 100. Accordingly, even in a case where the object 100 has a curved surface or irregularities, the liquid discharge apparatus 1000 can be provided that can apply the ink 325 to the object 100 with the head 300 being inclined according to the shape of the curved surface or irregularities and that is excellent in the application qualities of the ink 325 to the object 100.

In the present embodiment, the head 300 discharges the ink 325 by a continuous discharge type. Accordingly, since a predetermined amount of the ink 325 can be continuously applied to the object 100, the liquid discharge apparatus 1000 suitable for coating or painting can be provided. However, the discharge type of the head 300 in the liquid discharge apparatus 1000 is not limited to the continuous discharge type and may be a droplet discharge type in which the ink 325 is discharged as ink droplets.

Figure 15:
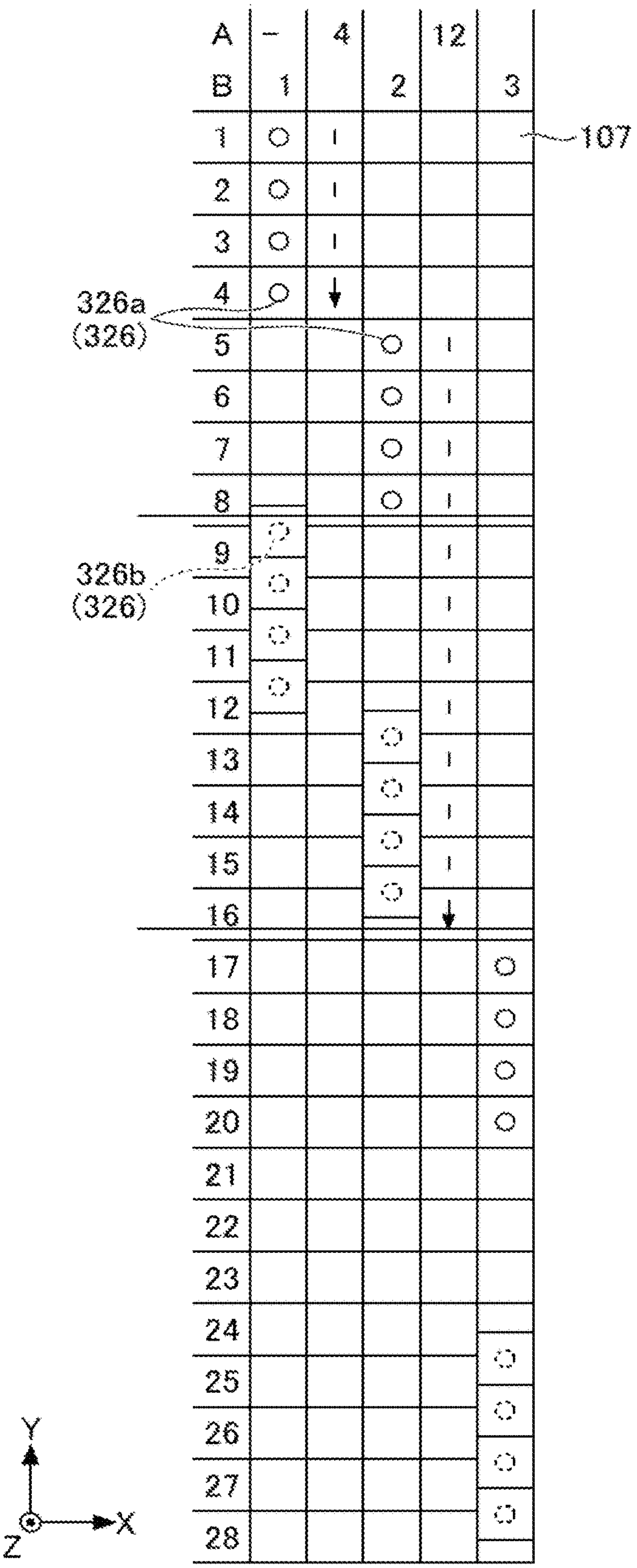
FIG. 15 is a diagram illustrating the ink application according to another example of the first embodiment of the present disclosure.
Figure 16:
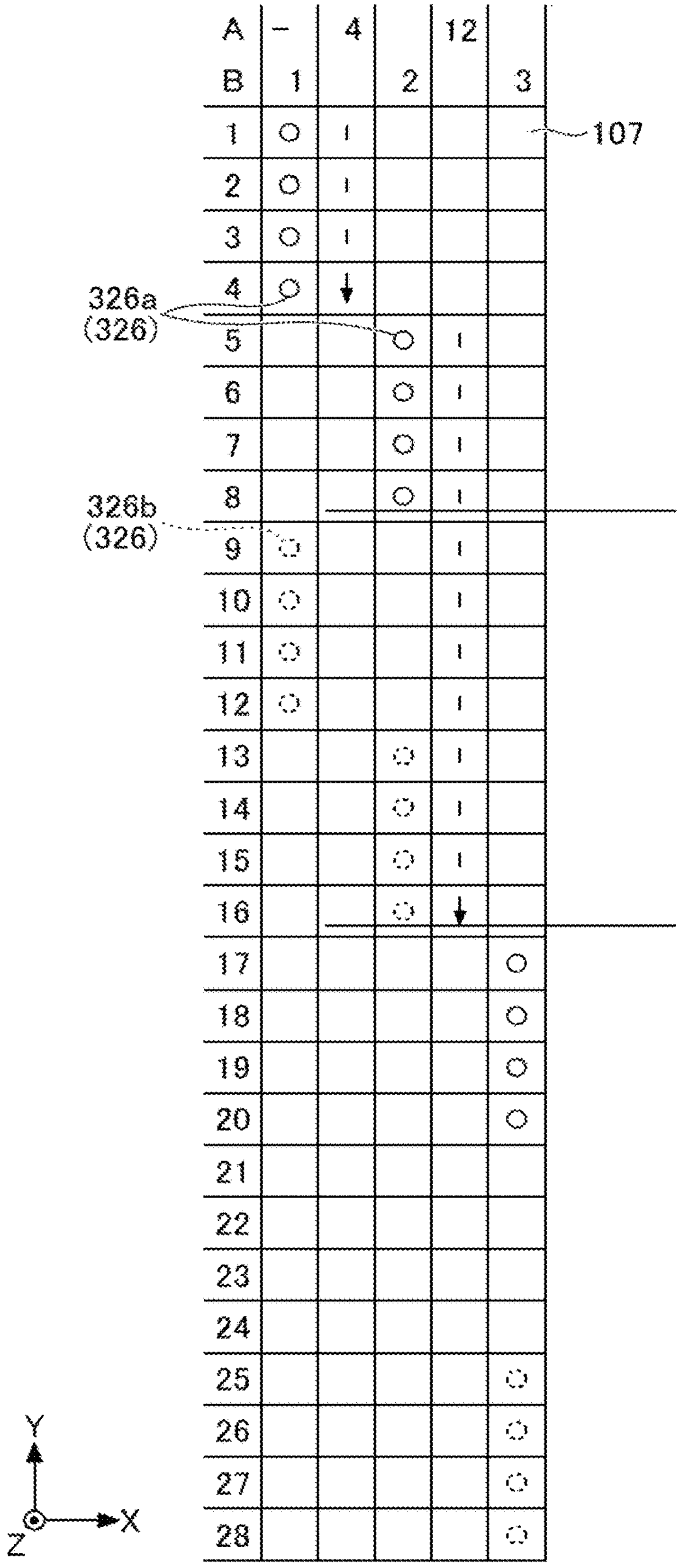
FIG. 16 is a diagram illustrating an example of the ink application in which a second interval is an integral multiple of a first interval according to the first embodiment of the present disclosure.

In the present embodiment, the controller 500 controls the rotator 120 to rotate the head 300 so that the second interval n be four times (integral multiple) the first interval m. Accordingly, in a state in which the head 300 has been rotated, the ink 325 discharged while the head 300 moves in the X-direction can be applied to the object 100 at equal intervals along the Y-direction. Thus, the liquid discharge apparatus 1000 can be provided that prevents uneven application of the ink 325 to the object 100 to uniformize the film thickness of the ink 325 and that is excellent in the application qualities of the ink 325 to the object 100. FIGS. 15 and 16 are diagrams illustrating the operation and effect of setting the second interval to be an integral multiple of the first interval. FIG. 15 is a diagram illustrating ink application according to another example of the present embodiment. FIG. 16 is a diagram illustrating an example of the ink application in which the second interval n is an integral multiple of the first interval m according to the present embodiment. FIGS. 15 and 16 are illustrated in the same manner as FIG. 13.

In the example of FIG. 15, the second interval n is 3.5 times the first interval m, which is a non-integral multiple. In this case, as illustrated in FIG. 15, the dots 326 are not applied at constant intervals along the Y-direction.

On the other hand, in the present embodiment, the second interval n is four times the first interval m, which is an integral multiple. In this case, as illustrated in FIG. 16, the dots 326 are applied at constant intervals along the −Y-direction. Accordingly, the film thickness of the ink 325 on the object 100 can be uniformized.

In another example, in a case where the dot interval is not constant along the Y-direction and the film thickness of the ink 325 increases due to the dots 326 overlapping each other only in a certain area, the ink amount of the ink 325 in the certain area may be reduced to reduce the size of the dots 326. As a result, the liquid discharge apparatus 1000 can prevent the film thickness of the ink 325 from being thick and can prevent the film thickness from being uneven.

In another example, in a case where the dot interval is not constant along the Y-direction and the film thickness of the ink 325 decreases due to the dots 326 being separated from each other only in a certain area, the movement amount A along the Y-direction may be decreased in the certain area (for example, the movement amount A is set to 11 dots). As a result, the liquid discharge apparatus 1000 can prevent the film thickness of the ink 325 from being thin and can prevent the film thickness from being uneven.

Second Embodiment

Example of Ink Application According to Second Embodiment

Next, an example of ink application according to a second embodiment by the liquid discharge apparatus 1000 is described. Note that the same components as the components described in the first embodiment are denoted by the same reference numerals, and redundant description is omitted as appropriate. The same applies to the embodiments described below.

In the present embodiment, the controller 500 controls the rotator 120 to rotate the head 300 such that the first interval m be an integral multiple of a minimum ink interval Δ between the inks 325 that can be applied to the object 100 by the head 300. Hereinafter, two examples of the case where the first interval m is one time the minimum ink interval Δ and the case where the first interval m is two times the minimum ink interval Δ are described. Note that the minimum ink interval Δ is an example of the minimum liquid interval.

Figure 17:
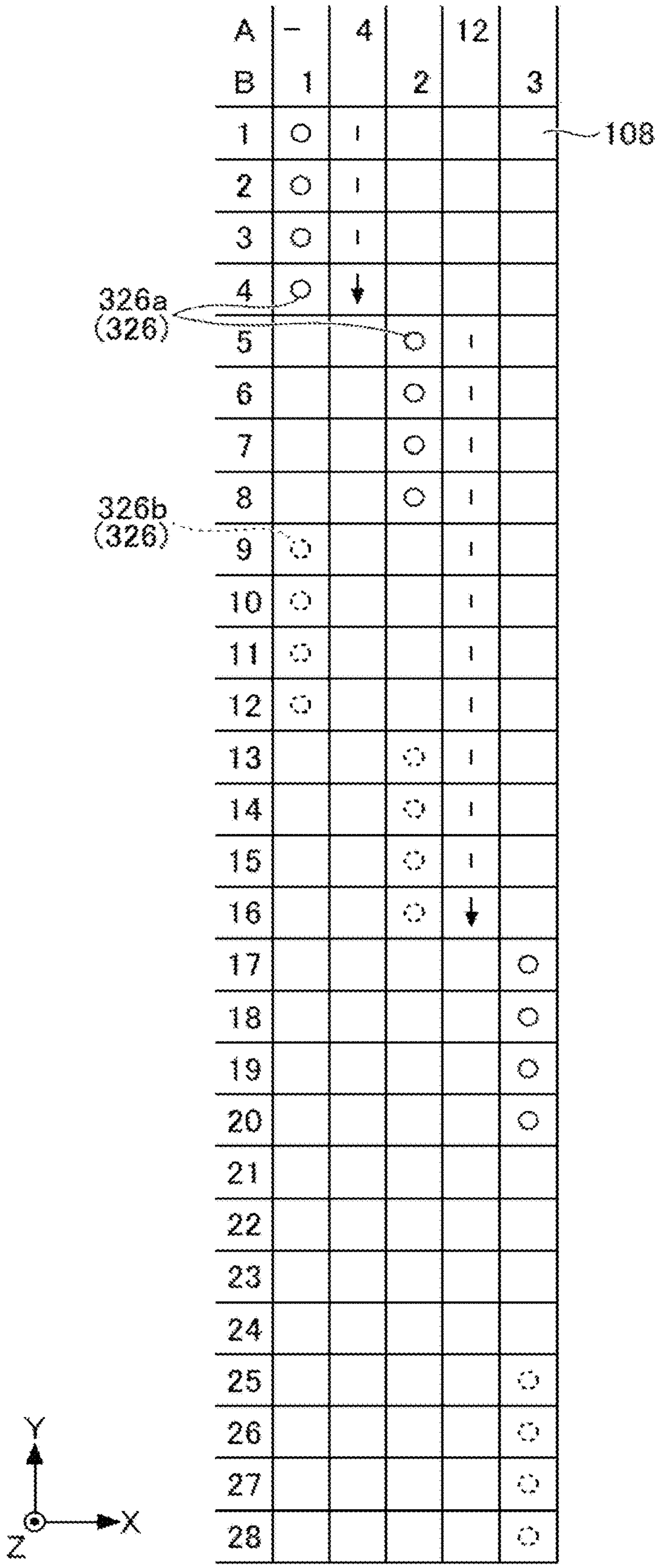
FIG. 17 is a diagram illustrating a first example of ink application according to a second embodiment of the present disclosure.
Figure 18:
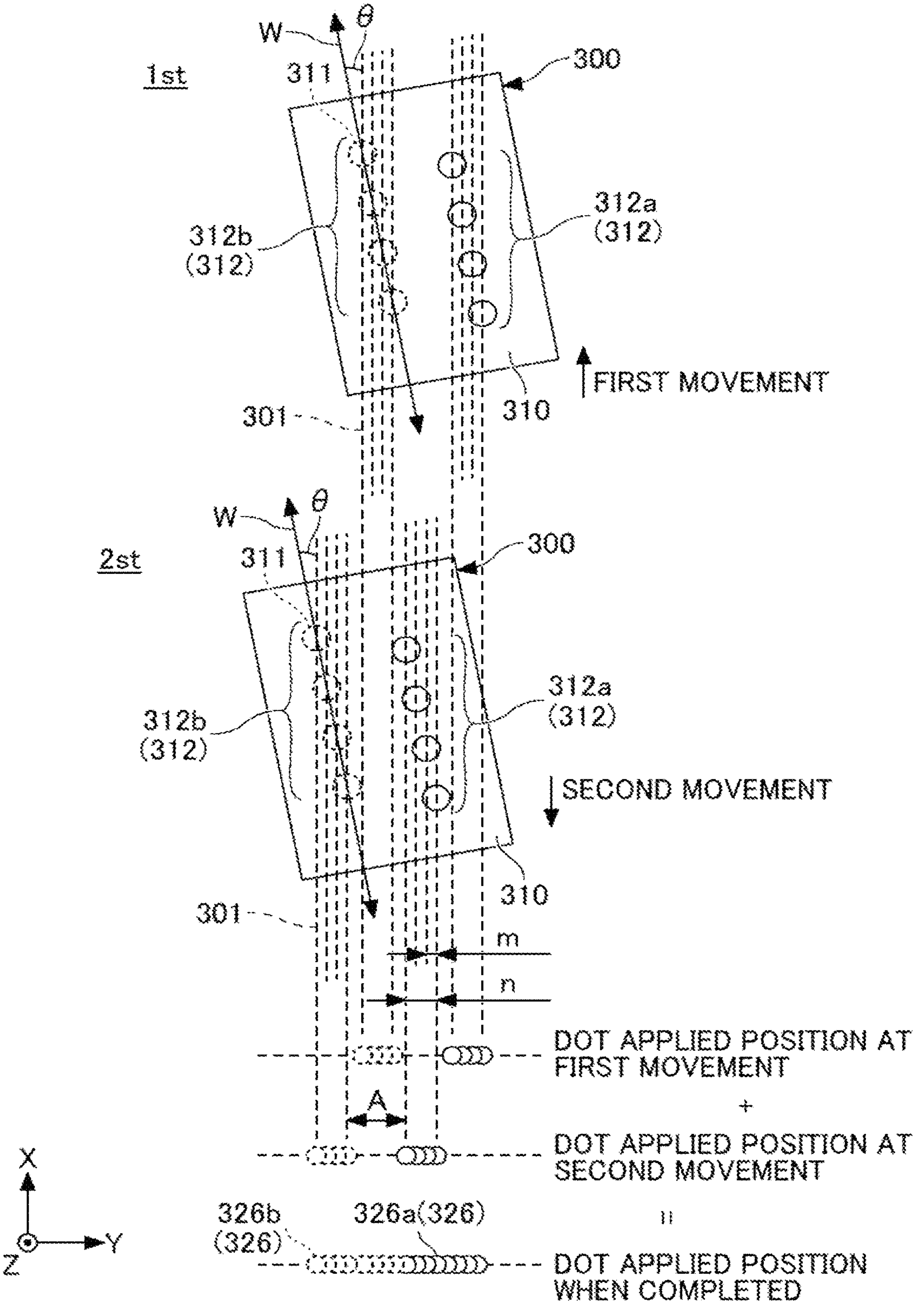
FIG. 18 is a diagram illustrating a first example of a relation between rotation of a head and a dot interval according to the second embodiment of the present disclosure.

Case where First Interval m is One time of Minimum Ink Interval Δ FIGS. 17 and 18 are diagrams illustrating a case where the first interval m is one time the minimum ink interval Δ, in other words, a case where the first interval m and the minimum ink interval Δ are the same, as a first example of the ink application according to the present embodiment. FIG. 17 is a diagram illustrating an example of the ink application. FIG. 18 is a diagram illustrating an example of the relation between rotation of the head 300 and dot intervals.

In the first example of the ink application, as illustrated in FIG. 17, the arrangement of the dots 326 of the ink 325 on the object 100 is the same as the arrangement illustrated in FIG. 13. However, a grid 108 differs from the grid 107 of FIG. 13 only in that the grid 108 corresponds to the minimum ink interval Δ. In the example illustrated in FIG. 17, the controller 500 controls the rotation of the head 300 by the rotator 120 so that the minimum ink interval Δ is equal to the first interval m.

As illustrated in FIG. 18, the relation between the rotation of the head 300 and the dot interval is the same as the relation illustrated in FIG. 14.

Case where First Interval m is Two Times Minimum Ink Interval Δ

Figure 19:
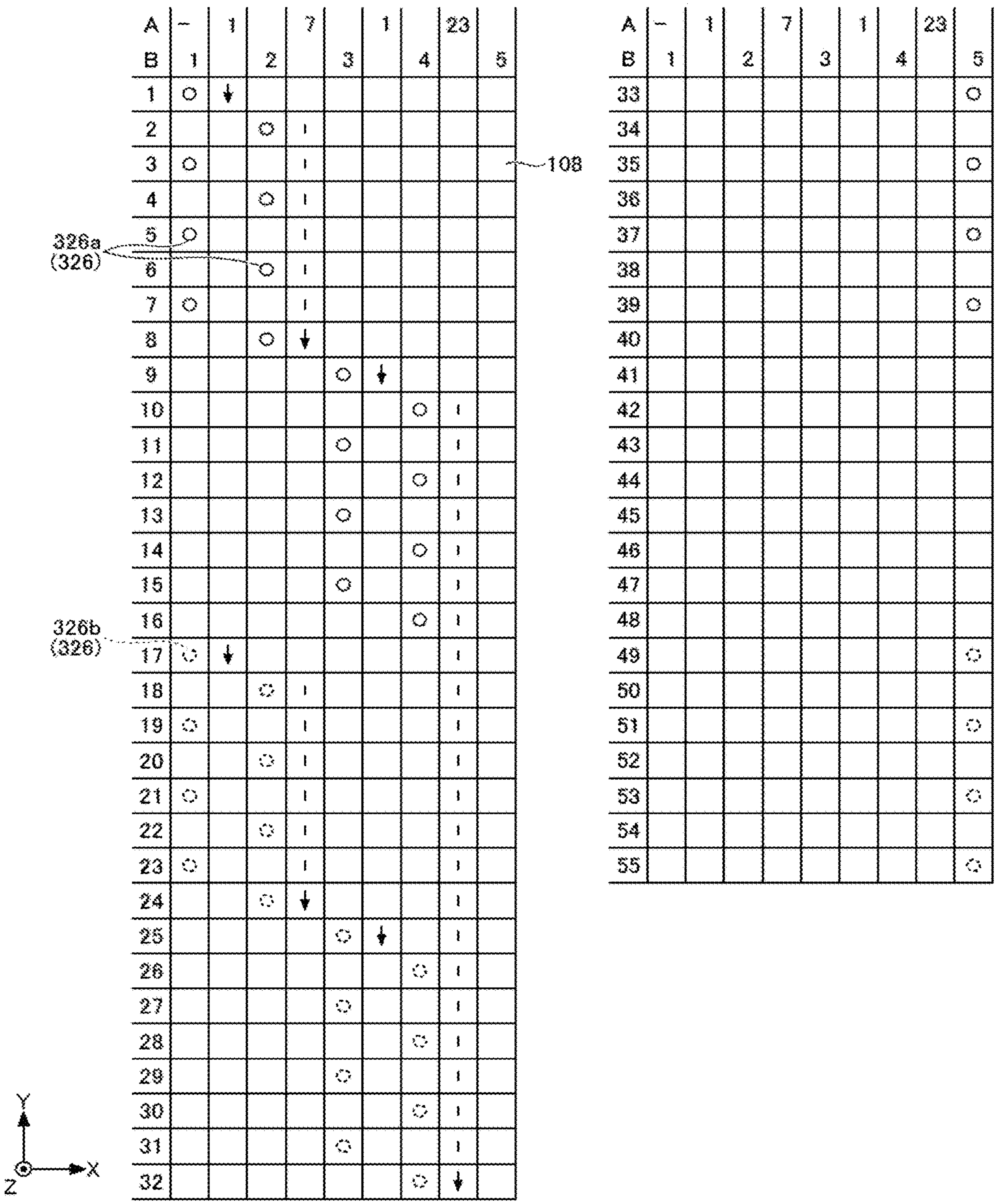
FIG. 19 is a diagram illustrating a second example of ink application according to the second embodiment of the present disclosure.
Figure 20:
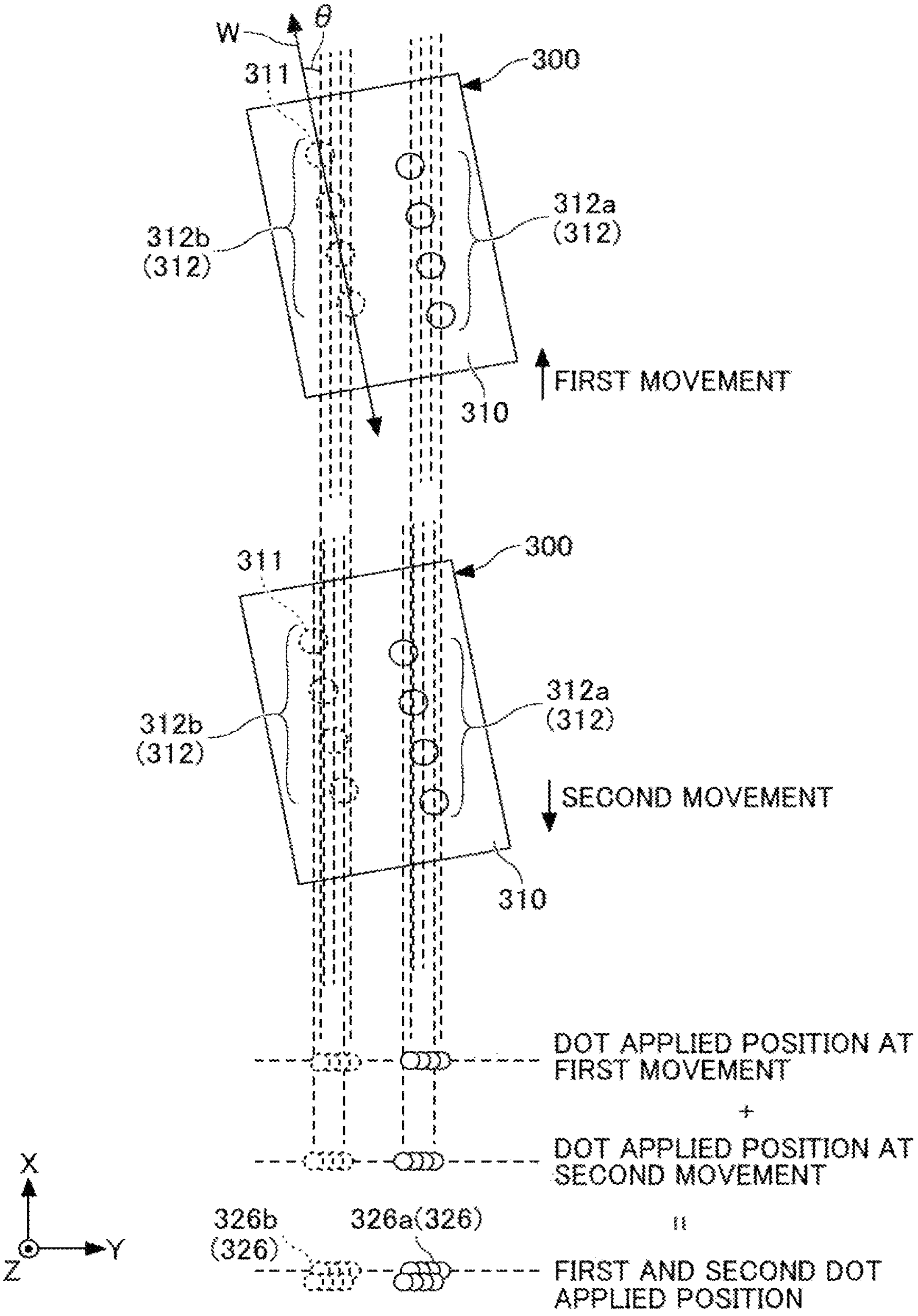
FIG. 20 is a first diagram illustrating the second example of the relation between the rotation of the head and the dot interval according to the second embodiment of the present disclosure.
Figure 21:
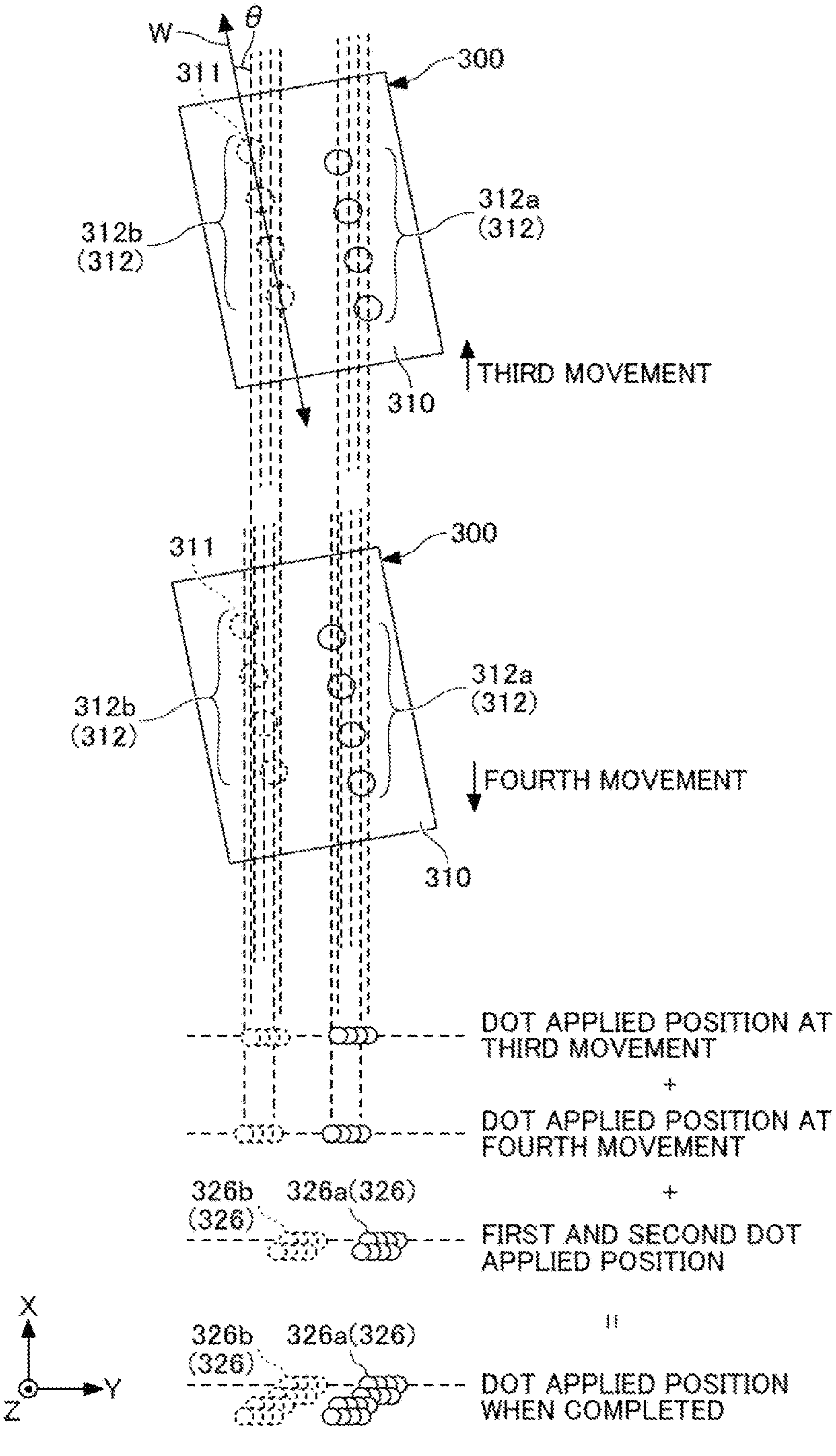
FIG. 21 is a second diagram illustrating the second example of the relation between the rotation of the head and the dot interval according to the second embodiment of the present disclosure.

FIGS. 19 to 21 are diagrams illustrating a case where the first interval m is two times the minimum ink interval Δ as a second example of the ink application according to the present embodiment. FIG. 19 is a diagram illustrating the second example of the ink application according to the second embodiment of the present disclosure. FIG. 20 and FIG. 21 are diagrams illustrating an example of the relation between the rotation of the head 300 and the dot interval. FIG. 20 is a first diagram of the example and FIG. 21 is a second diagram of the example.

FIG. 19 is viewed in the same manner as FIG. 13. However, the number of dots of the movement amount A and the number of times of movement B are different from those in FIG. 13, and the arrangement of the dots 326 on the object 100 is different from the arrangement in FIG. 13 in accordance with this difference. The grid 108 corresponds to the minimum ink interval Δ. In the example of FIG. 19, the controller 500 controls the rotation of the head 300 by the rotator 120 so that the first interval m is two times the minimum ink interval Δ.

FIGS. 20 and 21 are viewed in the same manner as in FIG. 14. FIG. 20 illustrates the relation between the rotation of the head 300 and the dot interval in a first movement and a second movement in the X-direction. FIG. 21 illustrates the relation between the rotation of the head 300 and the dot interval in a third movement and fourth movement in the X-direction.

As illustrated in FIGS. 19 and 20, the dots 326 are arranged in the second movement of the head 300 at positions where the dots 326 are not arranged in the first movement of the head 300 in the X-direction. Similarly, as illustrated in FIGS. 19 and 21, the dot 326 are arranged in the fourth movement of the head 300 at positions where the dot 326 are not arranged in the third movement of the head 300 in the X-direction. Accordingly, the liquid discharge apparatus 1000 can correct the unevenness of the nozzle interval.

As described above, in the present embodiment, the controller 500 controls the rotator 120 to rotate the head 300 so that the first interval m be an integral multiple of the minimum ink interval Δ between the inks 325 that can be applied to the object 100 by the head 300. As a result, the liquid discharge apparatus 1000 can be provided that prevents uneven application of the ink 325 to the object 100 to uniformize the film thickness of the ink 325 and that is excellent in the application qualities of the ink 325 to the object 100.

Figure 22:
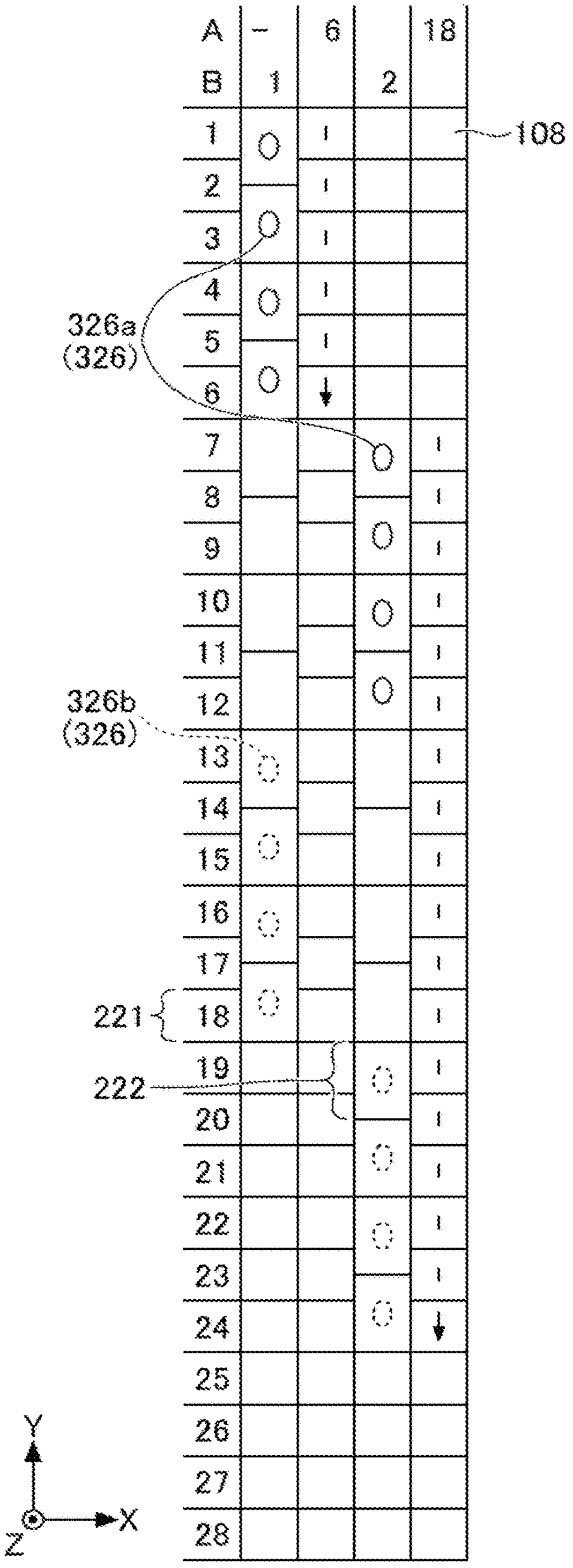
FIG. 22 is a diagram illustrating ink application according to another example of the second embodiment of the present disclosure.

FIG. 22 is a diagram illustrating ink application according to another example of the present embodiment. In the example illustrated in FIG. 22, the first interval m is 1.5 times the minimum ink interval Δ, which is a non-integral multiple of the minimum ink interval Δ.

In FIG. 22, with respect to a dot area 221 that is a target area in the Y-direction, the area in which the dot 326 is actually arranged is a dot area 222 that is larger than the dot area 221. The ink amount of the ink 325 discharged from the head 300 is optimized to the minimum ink interval Δ, which is a target dot interval. For this reason, in a case where the dot interval is larger than the minimum ink interval Δ in another example, an area where the ink 325 is not applied is generated in the object 100. However, when the amount of ink to form one dot 326 is partially increased in an area where the ink 325 is not applied, the area where the ink 325 is not applied to the object 100 can be prevented.

Third Embodiment

Example of Ink Application According to Third Embodiment

Next, an example of ink application according to a third embodiment by the liquid discharge apparatus 1000 is described. In the present embodiment, the controller 500 causes the head 300 to discharge the ink 325 by an interlace recording method to apply the ink 325 to a predetermined area of the object 100.

First, the interlace recording method is described below. In the interlace recording method, the liquid discharge apparatus 1000 applies dots of the ink 325 to the object 100 in two dimensions by a combination of movement of the head 300 along the X-direction and movement of the head 300 along the Y-direction.

In a case where ink is applied to a predetermined area on the object 100 at a desired dot interval by performing scans T times, the liquid discharge apparatus 1000 intermittently moves the head 300 in the Y-direction for the first time, the second time, the third time, and so on. The head 300 and the object 100 have a positional relation so that the object 100 connects to a position corresponding to the length of the nozzle row in which the nozzles 311 are arranged in the head 300 at the (T+1)-th time. In order to seamlessly connect the operations of performing T times of the ink application, the liquid discharge apparatus 1000 moves the head 300 in the Y-direction by the distance of "nozzle row length+one nozzle pitch" from the position of the head 300 in the Y-direction in the T-th movement in the X-direction and performs the (T+1)-th movement in the X-direction.

As an example, assume that in a case where the number of nozzles per inch in the head 300 is 100, a case where the liquid discharge apparatus 1000 performs the ink application two times in the X-direction and four times in the Y-direction, that is, eight times in total, at a dot interval of 600 dots per inch (dpi) in the X-direction and 400 dpi in the Y-direction.

In the case of the dot interval of 600 dpi in the X-direction and 400 dpi in the Y-direction, on the object 100, the interval between the dots 326 adjacent to each other along the X-direction is nearly equal to 42.3 micrometers (μm), which is calculated as "25.4 millimeters (mm)/600≈42.3 μm", and the interval between the dots 326 adjacent to each other along the Y-direction is 63.5 μm, which is calculated as "25.4 mm/400=63.5 μm". In the movement control of the head 300 and the timing control of discharge of ink from the head 300, the movement amount and the position are controlled based on the dot interval described above. For example, when eight scans are performed, the ink 325 corresponding to eight dots is applied to the predetermined area on the object 100 by the eight scans.

The liquid discharge apparatus 1000 can perform the interlace recording method as described above.

Figure 23:
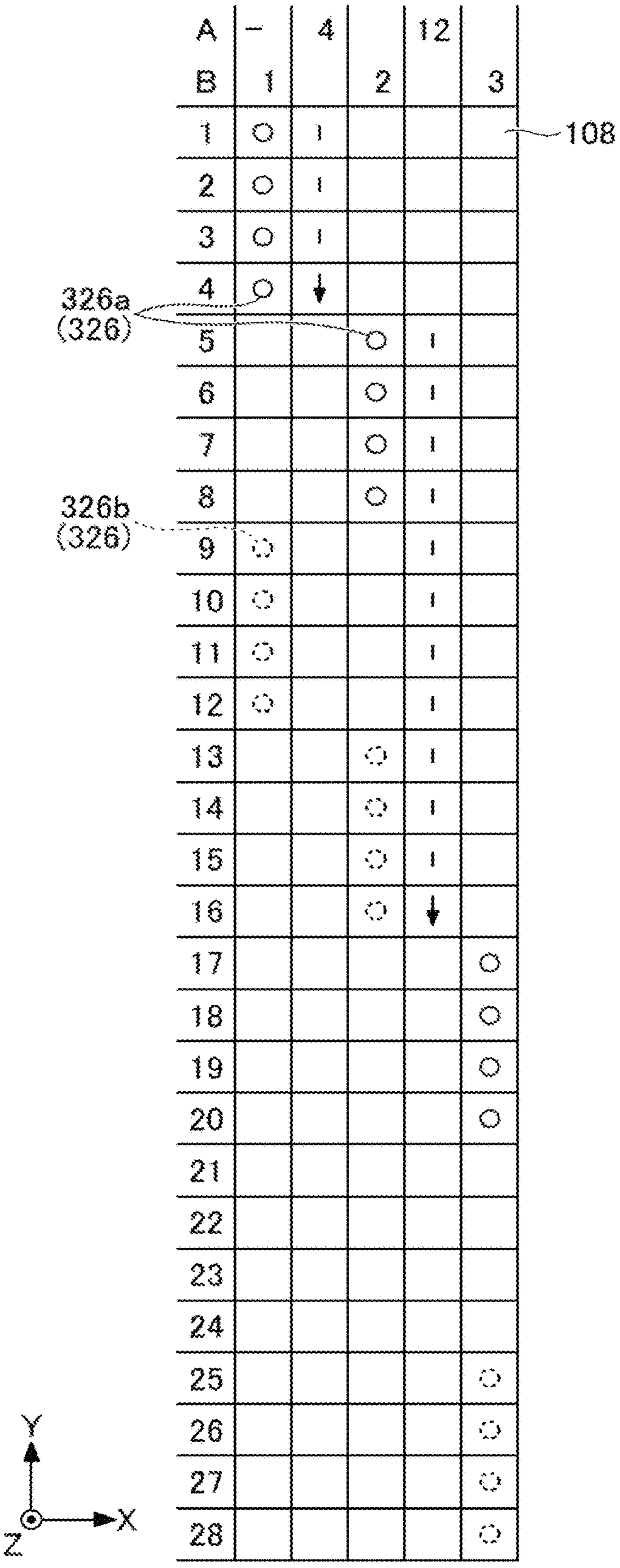
FIG. 23 is a diagram illustrating a first example of ink application according to a third embodiment of the present disclosure.
Figure 24:
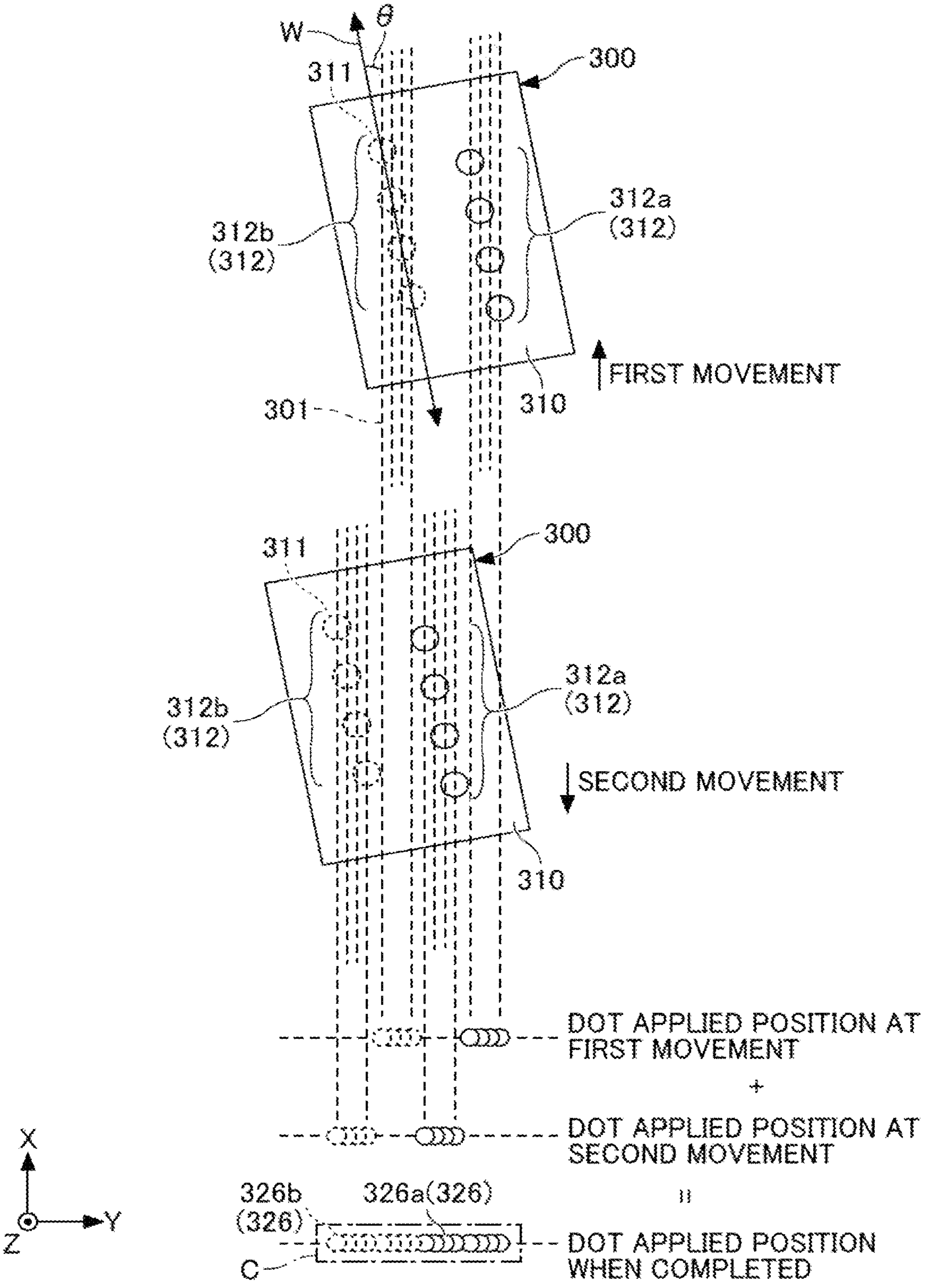
FIG. 24 is a diagram illustrating a first example of a relation between rotation of a head and a dot interval according to the third embodiment of the present disclosure.

Case where Number of Interlaces Kn is Two and Number of Times of Movement B in X-direction is Two FIGS. 23 and 24 are diagrams illustrating a case where the number of interlaces Kn is two and the number of times of movement B in the X-direction is two as a first example of the ink application according to the present embodiment. FIG. 23 is a diagram illustrating an example of the ink application. FIG. 24 is a diagram illustrating an example of the relation between rotation of the head 300 and dot intervals.

The number of interlaces Kn indicates the number of times of applying the ink 325 to the predetermined area in order to complete the ink application to the predetermined area by the interlace recording method.

As illustrated in FIG. 23, in the first example, the arrangement of the dots 326 of the ink 325 on the object 100 is the same as the arrangement illustrated in FIG. 13. However, a grid 108 differs from the grid 107 of FIG. 13 in that the grid 108 corresponds to the minimum ink interval Δ. As illustrated in FIG. 24, the relation between the rotation of the head 300 and the dot interval is the same as that illustrated in FIG. 14. Note that an area C in FIG. 24 is an example of a predetermined area in the interlace recording method.

Figure 25:
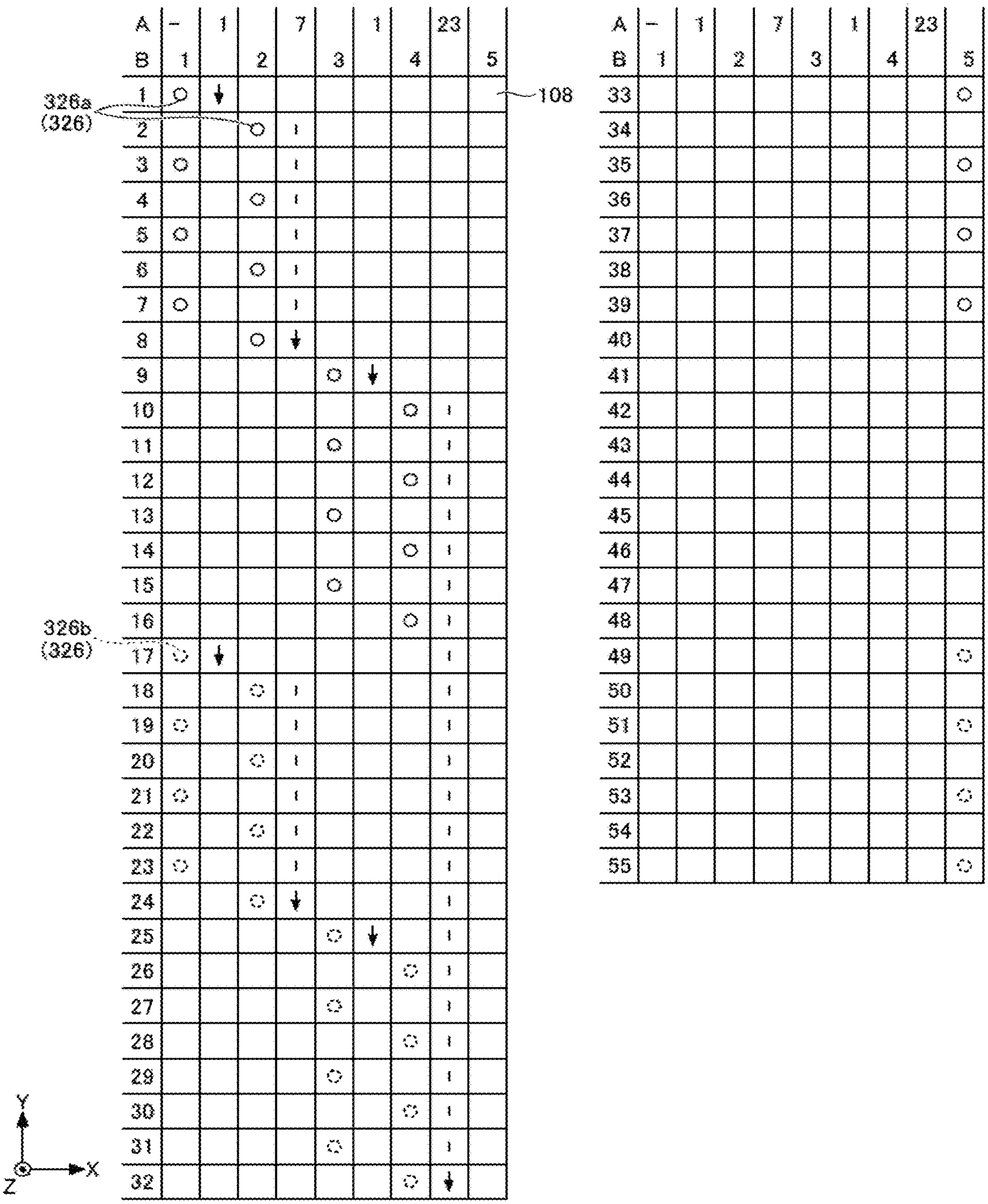
FIG. 25 is a diagram illustrating a second example of an ink application according to the third embodiment of the present disclosure.
Figure 26:
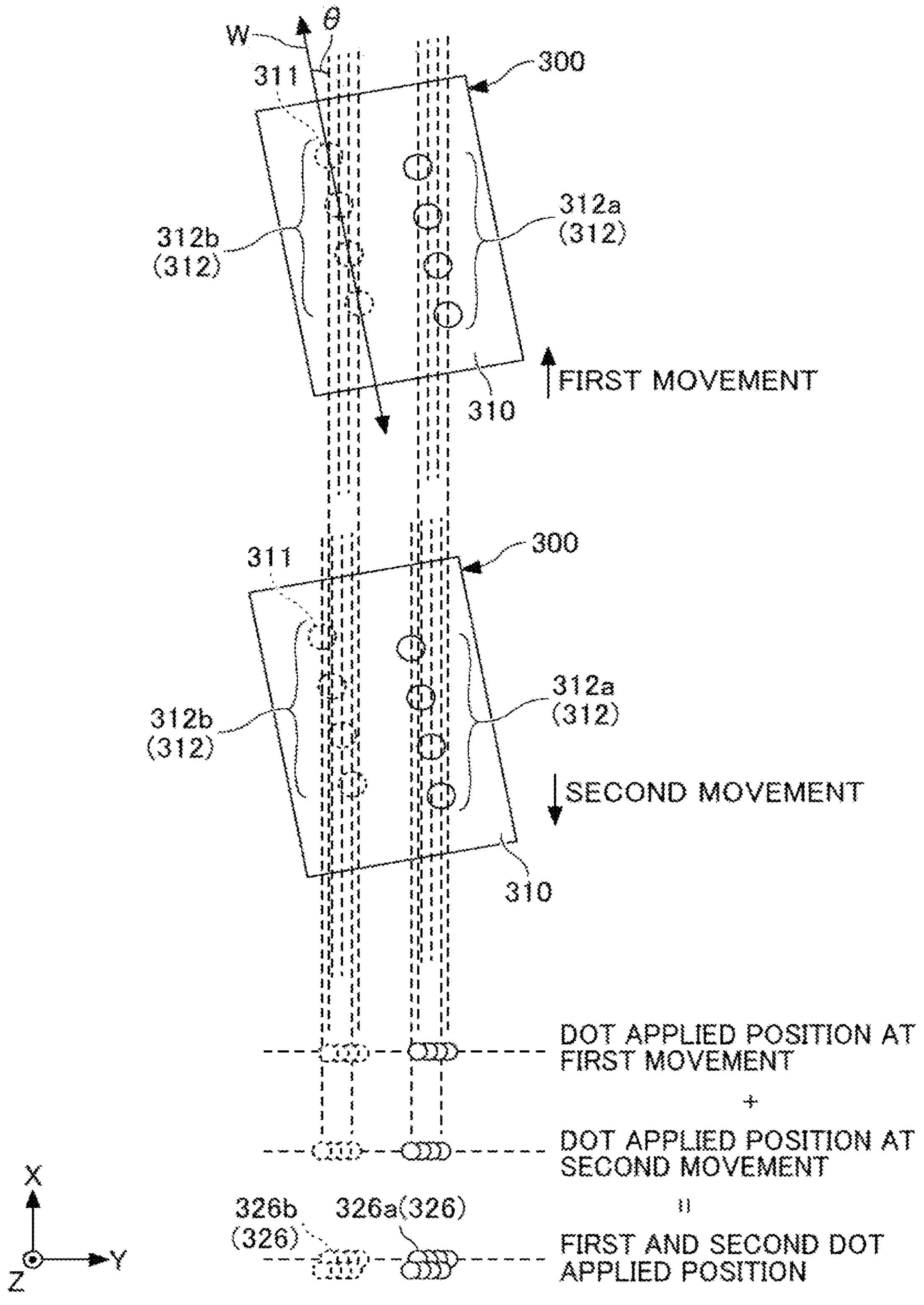
FIG. 26 is a first diagram illustrating the second example of the relation between the rotation of the head and the dot interval according to the third embodiment of the present disclosure.
Figure 27:
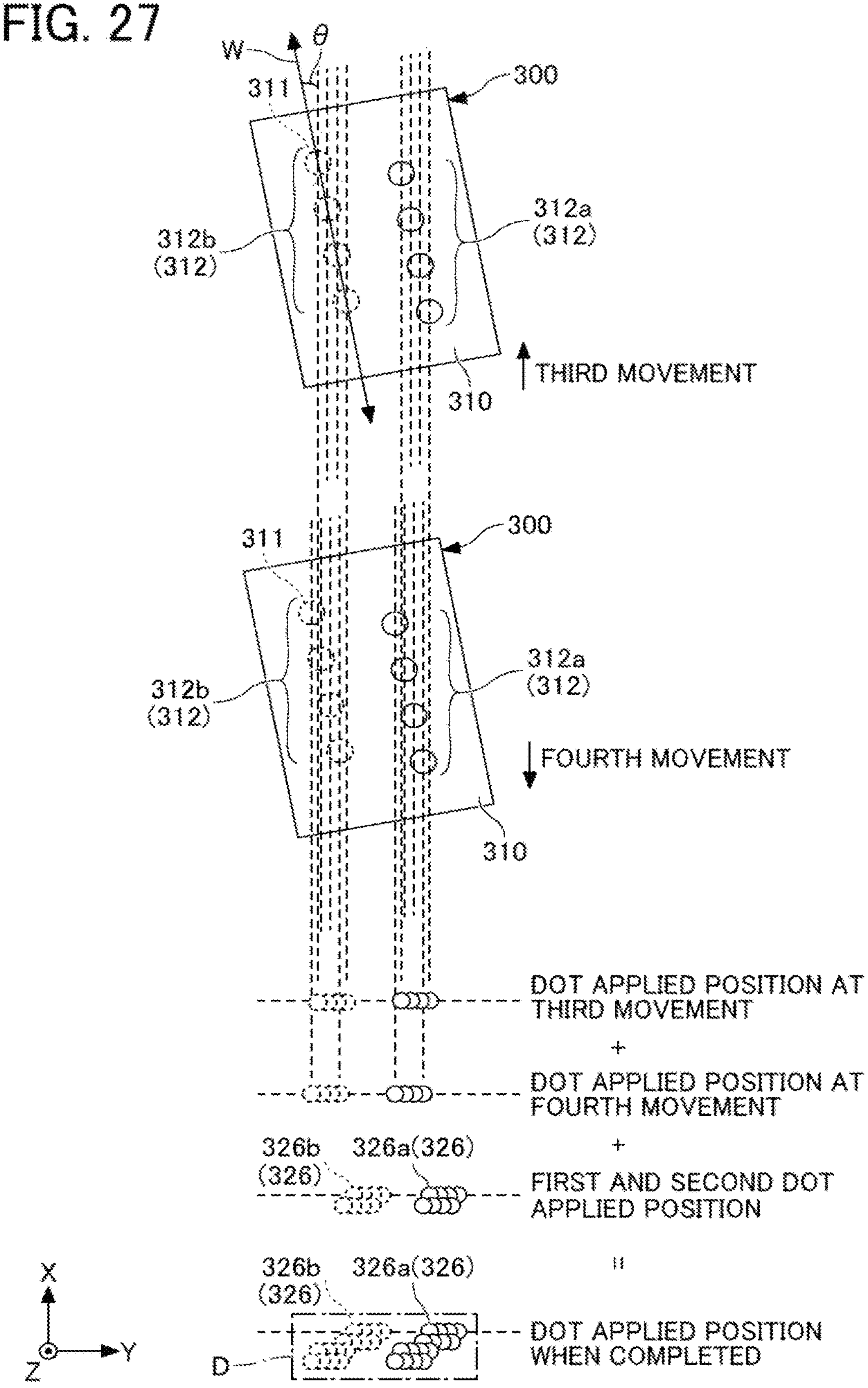
FIG. 27 is a second diagram illustrating the second example of the relation between the rotation of the head and the dot interval according to the third embodiment of the present disclosure.

Case where Number of Interlaces Kn is Four and Number of Times of Movement B in X-Direction is Four FIGS. 25 to 27 are diagrams illustrating a case where the number of interlaces Kn is four and the number of times of movement B in the X-direction is four as a second example of the ink application according to the present embodiment. FIG. 25 is a diagram illustrating the second example of the ink application according to the third embodiment of the present disclosure. FIG. 26 and FIG. 27 are diagrams illustrating an example of the relation between rotation of the head 300 and dot intervals. FIG. 26 is a first diagram and FIG. 27 is a second diagram of the example of the relation.

In the second example, the number of interlaces Kn is 4. Since the number of interlaces Kn in the second example is larger than two, which is the number of interlaces Kn in the first example, the minimum ink interval Δ in the second example is smaller than that in the first example. Note that an area D in FIG. 27 is an example of a predetermined area in the interlace recording method.

Figure 28:
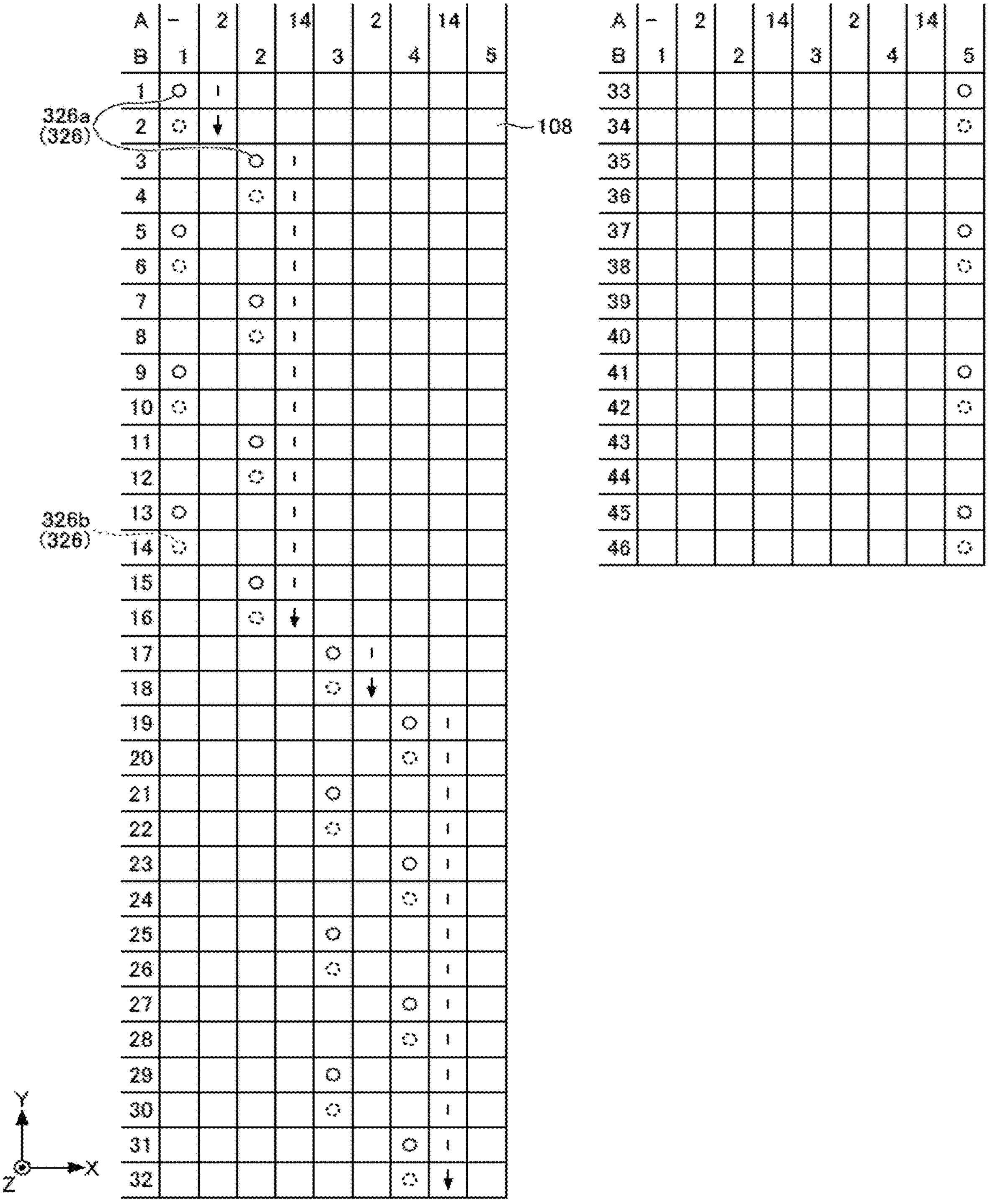
FIG. 28 is a diagram illustrating a third example of ink application according to the third embodiment of the present disclosure.
Figure 29:
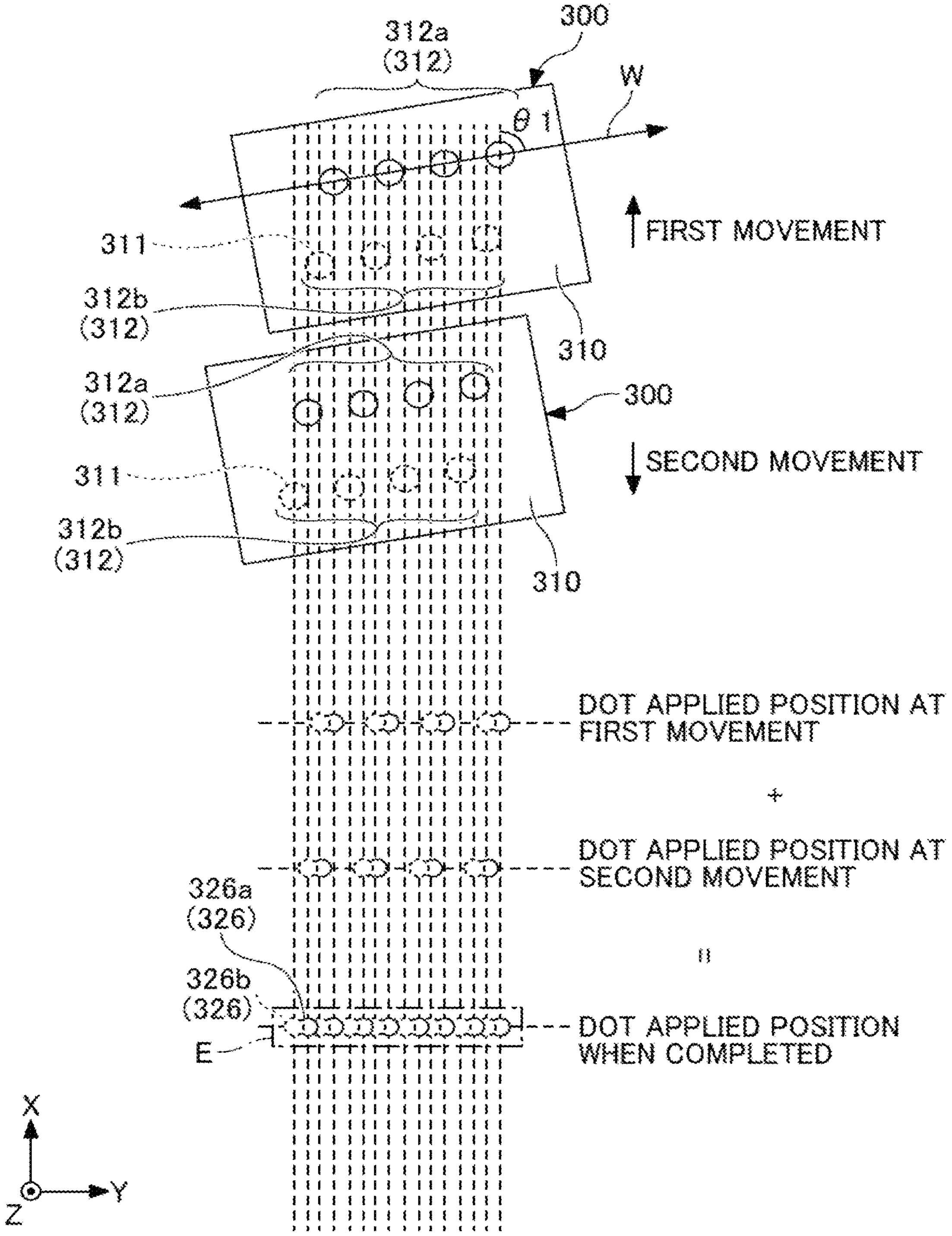
FIG. 29 is a diagram illustrating the third example of the relation between the rotation of the head and the dot interval according to the third embodiment of the present disclosure.

Case where the Head 300 is Rotated by 90 Degrees with Respect to the First Example FIGS. 28 and 29 are diagrams illustrating a third example of the ink application according to the present embodiment in which the number of interlaces Kn is four, the number of times of movement B in the X-direction is four, the head 300 rotates 90 degrees with respect to the first example of the present embodiment, and the angle formed by the X-direction and the nozzle row direction W is a rotation angle θ1. FIG. 28 is a diagram illustrating an example of the ink application. FIG. 29 is a diagram illustrating an example of the relation between rotation of the head 300 and dot intervals.

As illustrated in FIGS. 28 and 29, since the angle formed by the X-direction and the nozzle row direction W is the rotation angle θ1, the arrangement of the dots 326 and the relation between rotation of the head and dot intervals are different from those in the first example of the present embodiment. Note that an area E in FIG. 29 is an example of a predetermined area in the interlace recording method.

As described above, in the present embodiment, the controller 500 applies the ink 325 to the area C, D, or E as the predetermined area of the object 100 by discharge of the interlace recording method. The liquid discharge apparatus 1000 can reduce the dot interval by using the interlace recording method. In addition, since the liquid discharge apparatus 1000 moves the head 300 a plurality of times along the X-direction to apply the ink 325 to a predetermined area, a time difference can be provided between application timings of the ink 325 applied to adjacent positions on the object 100. Accordingly, movement due to merge of the adjacent inks 325 is suppressed. As a result, the liquid discharge apparatus 1000 can be provided that prevents uneven application of the ink 325 to the object 100 to uniformize the film thickness of the ink 325 and that is excellent in the application qualities of the ink 325 to the object 100.

Other Embodiments

Figure 30:
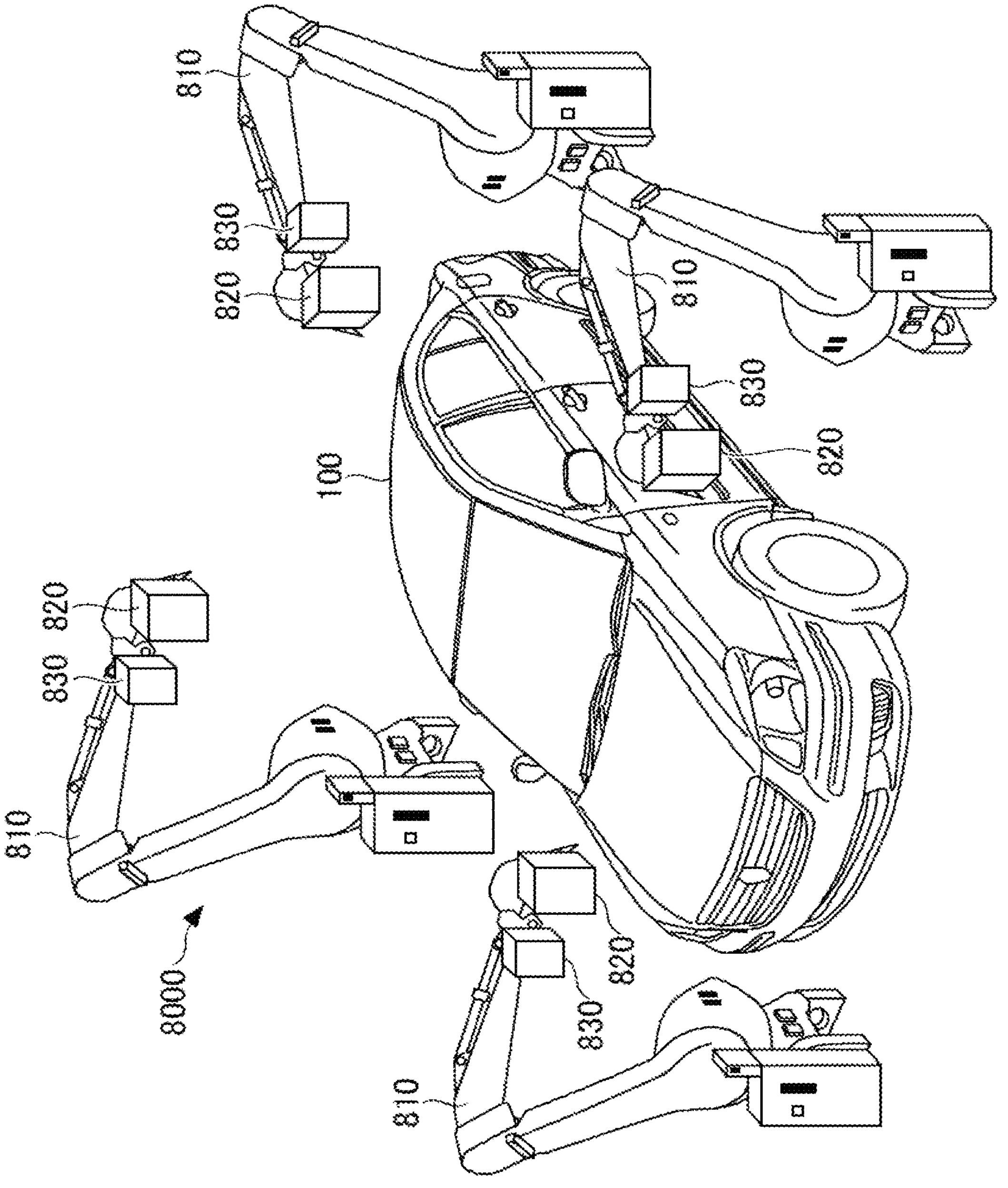
FIG. 30 is a diagram illustrating an example of application of a liquid discharge apparatus to a painting robot according to embodiments of the present disclosure.

The liquid discharge apparatus 1000 can be applied to various uses. FIG. 30 is a diagram illustrating an example of application of the liquid discharge apparatus 1000 to a painting robot 8000. The painting robot 8000 paints a vehicle body (body) of an automobile.

The painting robot 8000 includes a robot arm 810 that can freely move like human arms by a plurality of joints and includes a head 820 that discharges ink from a leading end of the robot arm 810. The robot arm 810 includes a three-dimensional (3D) sensor 830 disposed close to the head 820.

The robot arm 810 is an example of a robot mechanism that includes the mover 110 and holds the head 820. The 3D sensor 830 is an example of a detector that detects a shape of an object.

As the painting robot 8000, an articulated robot can be used that has an appropriate number of axes such as five axes, six axes, or seven axes. The painting robot 8000 detects a position of the head 820 with respect an object 100 (vehicle body in the present embodiment) by the 3D sensor 830 and moves the robot arm 810 based on the result of the detection to paint the object 100. In this case, the head 300 according to any of the above-described embodiments of the present disclosure can be used as the head 820. In the painting using such a robot arm 810, the liquid discharge apparatus 1000 can be provided that prevents uneven application of the ink 325 to the object 100 to uniformize the film thickness of the ink 325 and that is excellent in the application qualities of the ink 325 to the object 100.

Figure 31:
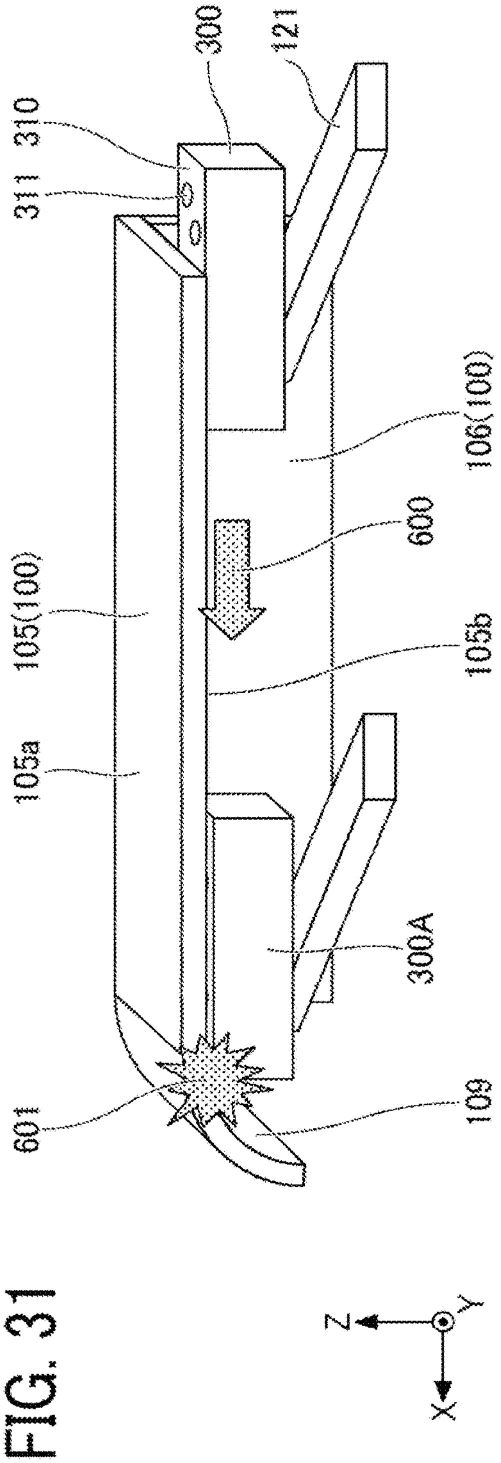
FIG. 31 is a diagram illustrating a first example of an operation of a head attached to a robot arm.
Figure 32:
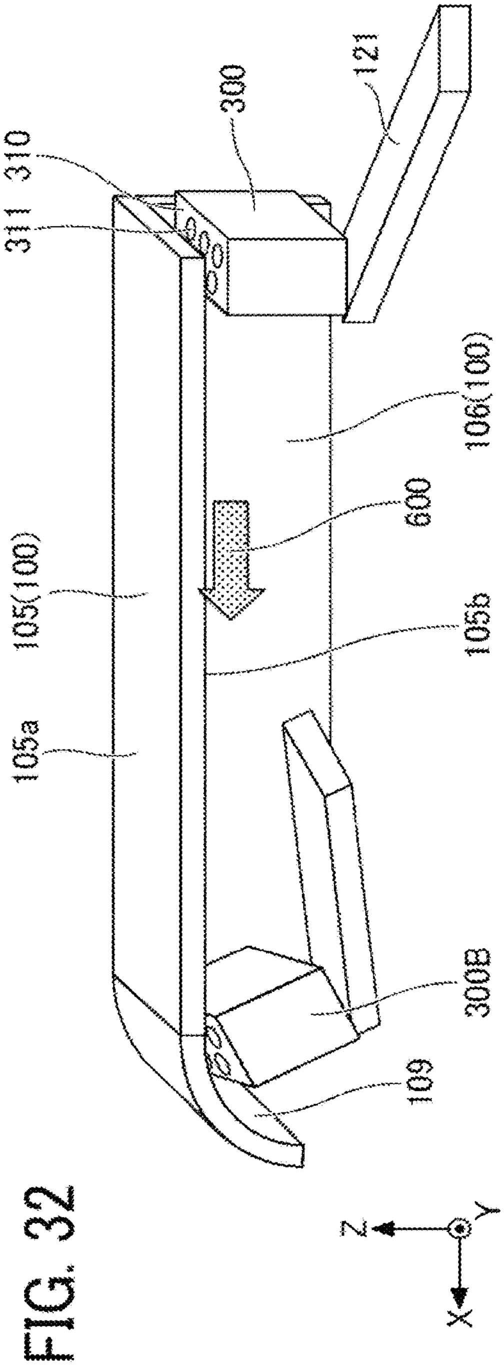
FIG. 32 is a diagram illustrating a second example of the operation of the head attached to the robot arm.
Figure 33:
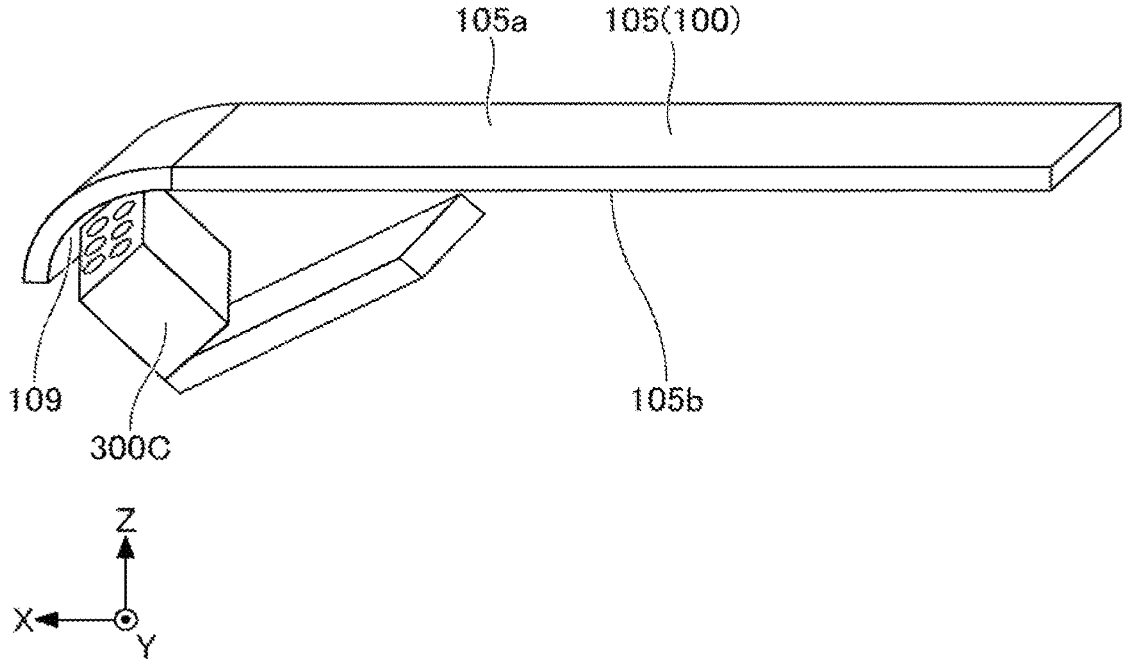
FIG. 33 is a diagram illustrating a third example of the operation of the head attached to the robot arm.

FIGS. 31 to 33 are diagrams illustrating the operation of the head 300 of the liquid discharge apparatus 1000 attached to the robot arm 810. Each of FIGS. 31 to 33 illustrates a state in which the head 300 is moved along the direction of an arrow 600.

A head 300A in FIG. 31 illustrates the head 300 after the head 300 has been moved along the arrow 600. As illustrated in FIG. 31, when the ink 325 is applied to a curved surface portion 109 without inclining the head 300A, for example, the head 300A and the curved surface portion 109 may collide with each other at a collision portion 601.

On the other hand, a head 300B in FIG. 32 illustrates the head 300 after the head 300 has been moved along the arrow 600 and after the inclination of the head 300 has been changed in accordance with the shape of the curved surface portion 109. A head 300C in FIG. 33 illustrates the head 300 after the inclination is further changed in accordance with the shape of the curved surface portion 109 from the state of the head 300 illustrated in FIG. 32.

As illustrated in FIGS. 32 and 33, since the inclination of the head 300 is changed in accordance with the shape of the curved surface portion 109, the risk that the head 300 collides with the curved surface portion 109 can be reduced.

The liquid discharge apparatus according to the present embodiment may predict whether a collision occurs between a coating target and a head in accordance with a posture of the head to perform an operation to avoid the collision when the collision may occur.

Figure 34:
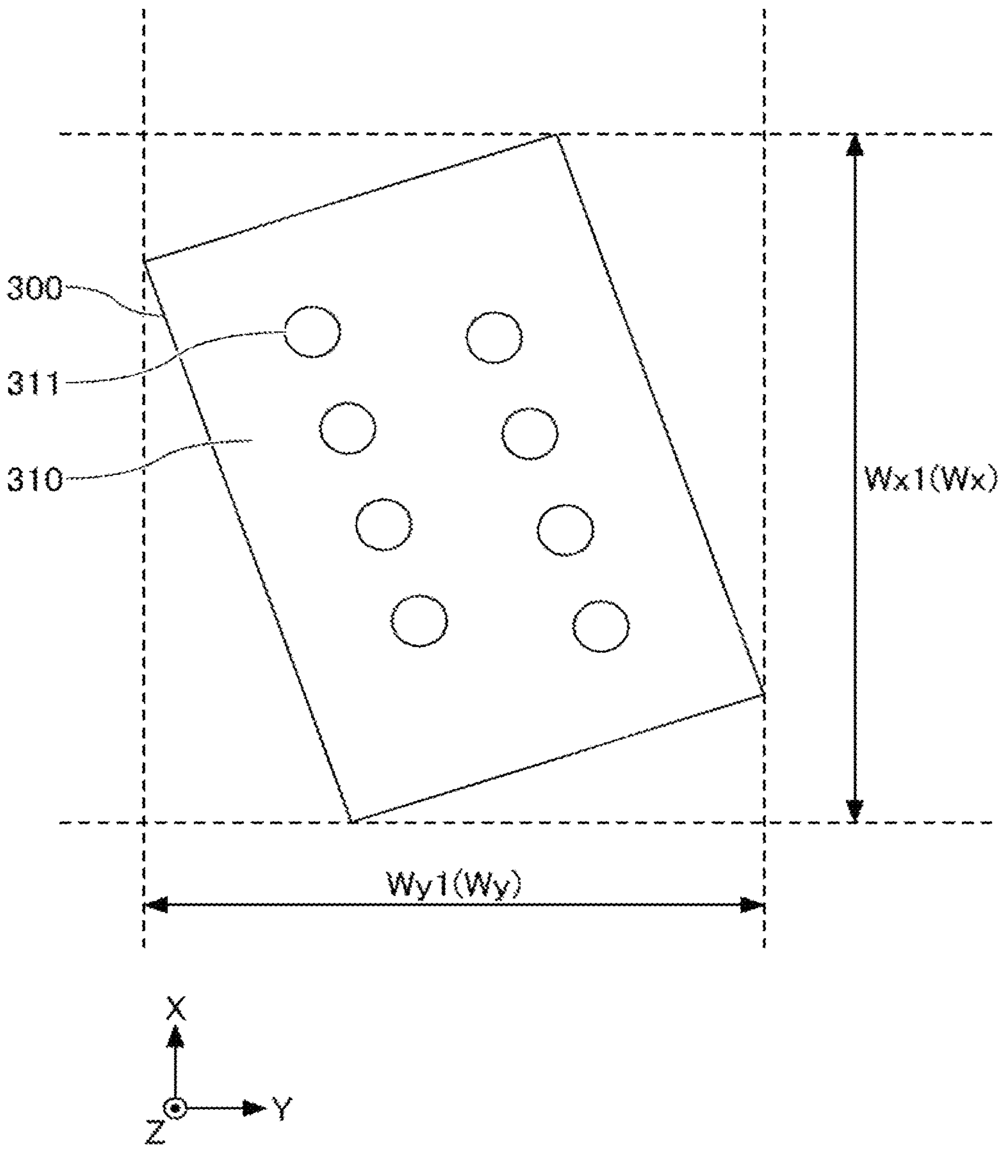
FIG. 34 is a first diagram illustrating an operation of collision avoidance in accordance with a posture of the head.
Figure 35:
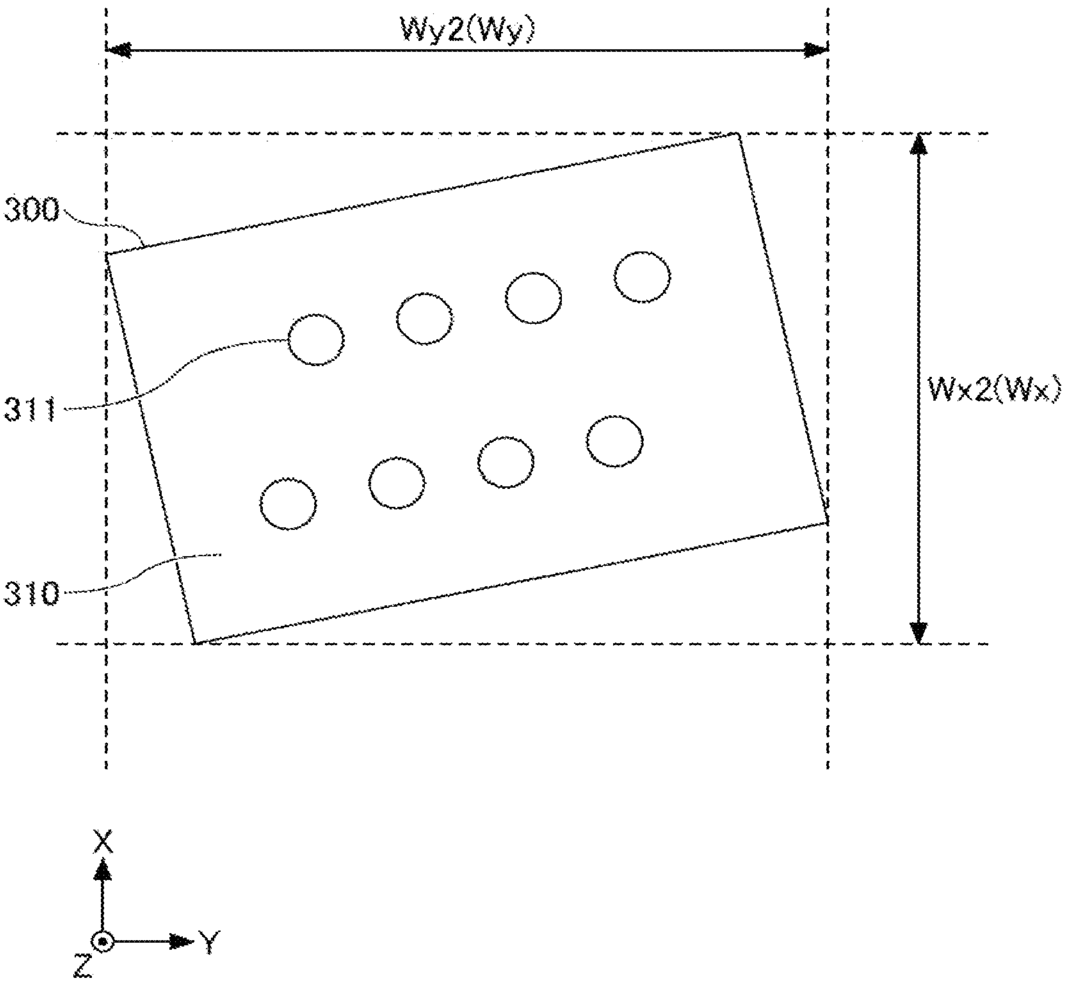
FIG. 35 is a second diagram illustrating the operation of collision avoidance in accordance with the posture of the head.

FIGS. 34 to 37 are diagrams illustrating an operation of collision avoidance in accordance with a posture of the head 300. As illustrated in FIGS. 34 and 35, when the posture of the head 300 changes, an apparent width Wy and an apparent length Wx of the head 300 change in accordance with the posture of the head 300. The posture of the head 300 indicates the inclination of the head 300 in a plane (X-Y plane) substantially parallel to the nozzle surface 310 on which the nozzles 311 are arranged. For example, when the posture of the head 300 changes, the inclination of the head 300 with respect to the main-scanning direction (X-direction) of the head 300 changes. The apparent width Wy indicates the length of the head 300 along the sub-scanning direction. The apparent length Wx indicates the length of the head 300 along the main-scanning direction. Each of the apparent width Wy and the apparent length Wx changes in accordance with the posture of the head 300.

Between the example illustrated in FIG. 34 and the example illustrated in FIG. 35, the posture of the head 300 is different by 90 degrees in a plane substantially parallel to the nozzle surface 310. In accordance with the difference of posture described above, the apparent length Wy1 of the head 300 illustrated in FIG. 34 is shorter than an apparent length Wy2 of the head 300 illustrated in FIG. 35. The apparent length Wx1 of the head 300 illustrated in FIG. 34 is longer than an apparent length Wx2 of the head 300 illustrated in FIG. 35.

The liquid discharge apparatus according to the present embodiment determines the apparent width Wy and the apparent length Wx of the head 300 based on the posture of the head 300. The liquid discharge apparatus according to the present embodiment predicts whether a collision occurs between a coating target and the head 300 when the head 300 is moved in the main-scanning direction, based on the main-scanning direction of the head 300 and the determined apparent width Wy and apparent length Wx of the head 300. When the collision may occur, for example, one of the two postures of the head 300 which are different from each other by 90 degrees in a plane substantially parallel to the nozzle surface 310 is selected to avoid collision. When a collision is predicted in both two postures of the head 300, the liquid discharge apparatus according to the present embodiment determines that coating cannot be performed and ends coating. As described above, the liquid discharge apparatus according to the present embodiment can perform coating while preventing the head 300 from colliding with the coating target.

Figure 36:
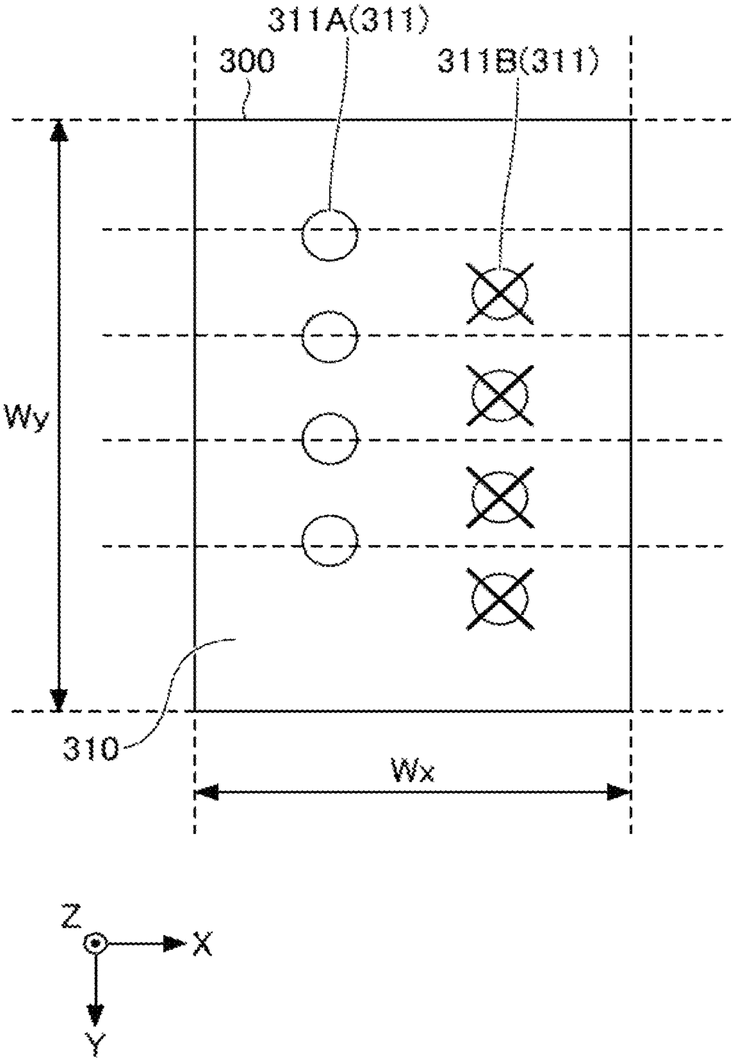
FIG. 36 is a third diagram illustrating the operation of collision avoidance in accordance with the posture of the head.
Figure 37:
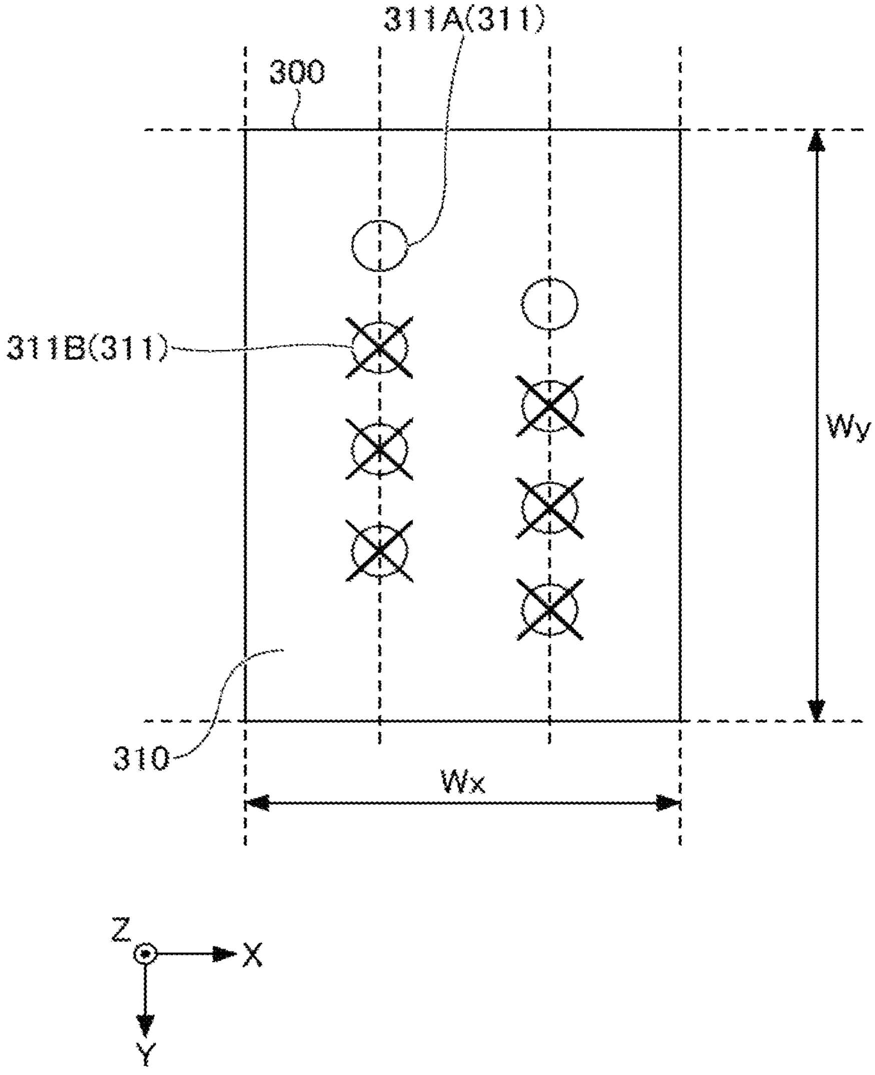
FIG. 37 is a fourth diagram illustrating the operation of collision avoidance in accordance with the posture of the head.

When a collision may occur based on the prediction result of the collision, the liquid discharge apparatus according to the present embodiment may limit the nozzles 311 used for coating in the head 300 as illustrated in FIGS. 36 and 37 to avoid the head 300 from colliding with the coating target.

In FIGS. 36 and 37, nozzles 311A are nozzles used for coating among the plurality of nozzles 311. On the other hand, among the plurality of nozzles 311, nozzles 311B indicated by "x" in the nozzles illustrated in FIGS. 36 and 37 are nozzles which are not used for coating.

For example, the liquid discharge apparatus according to the present embodiment can limit the nozzles 311 used for coating to one row among the two rows of nozzles 311 and use the nozzles 311A for coating to shorten the apparent length Wx of the head 300 as illustrated in FIG. 36. Alternatively, in the liquid discharge apparatus according to the present embodiment, as illustrated in FIG. 37, the nozzles used for coating in the two rows of nozzles 311 are limited to one nozzle per row. When the nozzles 311A used for coating are limited to two nozzles, the apparent width Wy of the head 300 can be shortened. Note that the row of the nozzles 311 is a row of the nozzles 311 arranged along the nozzle row direction W illustrated in FIG. 11. Due to the above-described configuration, the liquid discharge apparatus according to the present embodiment can coat while preventing the head 300 from colliding with the coating target.

The liquid discharge apparatus according to the present embodiment may change the number of nozzles used for discharging the liquid in accordance with the position or the inclination of the head 300. For example, when the liquid discharge apparatus according to the present embodiment discharges the liquid to a corner portion of the coating target, only the nozzles positioned in the vicinity of the corner portion among the nozzles included in the head 300 can be used for discharge in a state in which the head 300 is inclined with respect to the surface of the coating target so that the nozzle surface 310 faces the corner portion. As a result, the liquid discharge apparatus can coat the corner portion of the coating target while uniformizing the thickness of the coating.

In some embodiments of the present disclosure, for example, a liquid to be discharged from the head 300 may include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as deoxyribonucleic acid (DNA), amino acid, protein, or calcium, or an edible material, such as a natural colorant. These liquids can be used for, e.g., inkjet ink, coating paint, surface treatment solution, a liquid for forming components of electronic element or light-emitting element or a resist pattern of electronic circuit, or a material solution for three-dimensional fabrication.

The object 100 is a material to which liquid is attached and firmly adheres or an object to which liquid is attached and penetrates. Specific examples of the material include, but are not limited to, a recording medium such as a vehicle body, building material, a sheet, recording sheet, a recording sheet of paper, a film, or cloth, an electronic component such as an electronic substrate or a piezoelectric element, and a medium such as layered powder, an organ model, or a testing cell. The material includes any material to which liquid is adhered, unless particularly limited.

Aspects of the present disclosure are, for example, as follows.

Aspect 1

A liquid discharge apparatus is configured to discharge liquid to apply the liquid to an object. The liquid discharge apparatus includes a head, a mover, a rotator, and a controller. The head includes a nozzle surface in which nozzles that discharge the liquid is formed. The mover is a mechanism that relatively moves the head and the object in each of a first direction and a second direction along the nozzle surface. The first direction and the second direction are orthogonal to each other. The rotator is a mechanism that rotates the head along the nozzle surface. The controller controls relative movement by the mover and rotation by the rotator. The head includes a plurality of nozzle rows in which a plurality of nozzles are arranged in a third direction. The controller controls the relative movement by the mover to correct unevenness of a nozzle interval between the nozzles along the second direction caused by an inclination between the first direction and the third direction when the head is rotated by the rotator.

Aspect 2

In the liquid discharge apparatus described in Aspect 1, a nozzle passing line is a line passing through the nozzle center of each of the plurality of nozzles included in the head along the first direction. The interval between the nozzle passing lines adjacent to each other along the second direction among the plurality of nozzle passing lines includes a first interval and a second interval. The length of the second interval is greater than or equal to the length of the first interval. The controller causes the mover to perform one or more relative movements along the first direction to apply the liquid to an area corresponding to the length of the first interval in the object and one relative movement along the first direction to apply the liquid to an area corresponding to the length of the second interval in the object.

Aspect 3

In the liquid discharge apparatus described in Aspect 2, the controller causes the mover to perform one or more relative movements along the first direction to apply the liquid to an area of the object corresponding to the length of the first interval. After that, the controller causes the mover to perform one relative movement along the first direction to apply the liquid to an area of the object corresponding to the length of the second interval. Then, the controller causes the mover to perform one or more relative movements along the first direction to apply the liquid to an area of the object corresponding to the length of the first interval.

Aspect 4

In the liquid discharge apparatus described in Aspect 2 or Aspect 3, the controller causes the rotator to rotate the head such that the second interval is an integral multiple of the first interval.

Aspect 5

In the liquid discharge apparatus described in any one of Aspects 2 to 4, the controller causes the rotator to rotate the head such that the first interval is an integral multiple of a minimum liquid interval between liquids to be applied to the object by the head.

Aspect 6

In the liquid discharge apparatus described in any one of Aspects 1 to 5, the controller discharges the liquid by an interlace recording method to apply the liquid to a predetermined area of the object.

Aspect 7

The liquid discharge apparatus described in any one of Aspects 1 to 6 includes the mover and a robot including the head.

Aspect 8

In the liquid discharge apparatus described in any one of Aspects 1 to 7, the head discharges the liquid by a continuous discharge method.

Aspect 9

In the liquid discharge apparatus described in any one of Aspects 1 to 8, the controller causes the rotator to rotate the head based on a shape of the object.

Aspect 10

The liquid discharge apparatus described in Aspect 9 further includes a detector to detect the shape of the object. The controller causes the rotator to rotate the head based on the shape detected by the detector.

Aspect 11

The liquid discharge apparatus described in Aspect 9 further includes a storage device that stores information on the shape of the object. The controller causes the rotator to rotate the head based on the information on the shape read from the storage device.

Aspect 12

A liquid discharge method is performed by a liquid discharge apparatus to discharge liquid to apply the liquid to an object. The liquid discharge method includes: discharging the liquid from a head including a nozzle surface in which nozzles are formed in the liquid discharge apparatus; relatively moving the head and the object by a mover in each of a first direction and a second direction orthogonal to each other along the nozzle surface; rotating the head along the nozzle surface by a rotator; and controlling relative movement by the mover and rotation by the rotator with a controller. The head includes a plurality of nozzle rows in which a plurality of nozzles are arranged in a third direction. The controlling controls the relative movement by the mover to correct unevenness of a nozzle interval between the nozzles along the second direction caused by an inclination between the first direction and the third direction when the head is rotated by the rotator.

Aspect 13

A program is performed by a liquid discharge apparatus. The program causes the liquid discharge apparatus to execute a process. The process includes: discharging liquid from a head including a nozzle surface in which nozzles are formed; relatively moving the head and an object by a mover in each of a first direction and a second direction orthogonal to each other along the nozzle surface; rotating the head along the nozzle surface by a rotator; and controlling relative movement by the mover and rotation by the rotator with a controller. The head includes a plurality of nozzle rows in which a plurality of nozzles are arranged in a third direction. The controlling controls the relative movement by the mover to correct unevenness of a nozzle interval between the nozzles along the second direction caused by an inclination between the first direction and the third direction when the head is rotated by the rotator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A liquid discharge apparatus configured to discharge liquid to apply the liquid to an object, the liquid discharge apparatus comprising:

a head having a nozzle surface in which a plurality of nozzle rows each including a plurality of nozzles configured to discharge the liquid are arranged;

a mover configured to relatively move the head and the object in each of a first direction and a second direction orthogonal to each other along the nozzle surface;

a rotator configured to rotate the head by a rotation angle along the nozzle surface; and processing circuitry configured to control the relative movement by the mover to correct unevenness of a nozzle interval between the plurality of nozzles along the second direction, as viewed in the first direction orthogonal to the second direction, the unevenness being caused by an inclination between the first direction and a third direction when the head is rotated by the rotator, the third direction being a direction in which the plurality of nozzles are arranged in each of the plurality of nozzle rows, wherein the processing circuitry is further configured to determine the rotation angle of the head based on a shape of the object, predict whether a collision occurs between the object and the head, and in response to predicting that the collision occurs, cause the rotator to rotate the head from a first posture to a second posture selected to avoid collision, the first posture and the second posture of the head being different from each other by a predetermined degree in a plane parallel to the nozzle surface.

2. The liquid discharge apparatus according to claim 1, wherein the plurality of nozzle rows are arranged in the nozzle surface in a manner such that a plurality of nozzle passing lines has a first interval between one pair of nozzle passing lines adjacent to each other along the second direction and a second interval between another pair of nozzle passing lines adjacent to each other along the second direction, the second interval being greater than or equal to a length of the first interval, each of the nozzle passing lines being a line passing through a center of one of the plurality of nozzles along the first direction, and wherein the processing circuitry is configured to cause the mover to perform one or more relative movements along the first direction to apply the liquid to an area corresponding to the length of the first interval in the object and one relative movement along the first direction to apply the liquid to an area corresponding to the length of the second interval in the object.

3. The liquid discharge apparatus according to claim 2, wherein the processing circuitry is configured to cause the mover to perform the one or more relative movements along the first direction to apply the liquid to the area corresponding to the length of the first interval in the object, then perform the one relative movement along the first direction to apply the liquid to the area corresponding to the length of the second interval in the object, and then perform one or more relative movements along the first direction to apply the liquid to another area corresponding to the length of the first interval in the object.

4. The liquid discharge apparatus according to claim 2, wherein the processing circuitry is configured to cause the rotator to rotate the head to a position at which the second interval is an integral multiple of the first interval.

5. The liquid discharge apparatus according to claim 2, wherein the processing circuitry is configured to cause the rotator to rotate the head to a position at which the first interval is an integral multiple of a minimum interval between dots of the liquid to be applied to the object by the head.

6. The liquid discharge apparatus according to claim 1, wherein the processing circuitry is configured to cause the head to discharge the liquid by interlace recording to apply the liquid to a predetermined area of the object.

7. The liquid discharge apparatus according to claim 1, further comprising a robot including the mover and holding the head.

8. The liquid discharge apparatus according to claim 1, wherein the head is configured to discharge the liquid by continuous discharging.

9. The liquid discharge apparatus according to claim 1, further comprising a detector configured to detect the shape of the object, and wherein the processing circuitry is configured to cause the rotator to rotate the head based on the shape detected by the detector.

10. The liquid discharge apparatus according to claim 1, further comprising a storage device that stores information on the shape of the object, and wherein the processing circuitry is configured to cause the rotator to rotate the head based on the information on the shape read from the storage device.

11. A liquid discharge method to be executed by a liquid discharge apparatus that discharges liquid to apply the liquid to an object, the method comprising:

discharging the liquid from a head having a nozzle surface in which a plurality of nozzle rows each including a plurality of nozzles configured to discharge the liquid are arranged;

relatively moving, by a mover, the head and the object in each of a first direction and a second direction orthogonal to each other along the nozzle surface;

rotating, by a rotator, the head by a rotation angle along the nozzle surface;

controlling relative movement by the mover to correct unevenness of a nozzle interval between the plurality of nozzles along the second direction, as viewed in the first direction orthogonal to the second direction, the unevenness being caused by an inclination between the first direction and a third direction when the head is rotated by the rotator, the third direction being a direction in which the plurality of nozzles are arranged in each of the plurality of nozzle rows;

determining the rotation angle of the head based on a shape of the object;

predicting whether a collision occurs between the object and the head; and in response to predicting that the collision occurs, causing the rotator to rotate the head from a first posture to a second posture selected to avoid collision, the first posture and the second posture of the head being different from each other by a predetermined degree in a plane parallel to the nozzle surface.

* * * * *